United States Patent
Pedemonte et al.

(10) Patent No.: US 6,870,035 B2
(45) Date of Patent: Mar. 22, 2005

(54) BLACK DYE MIXTURES OF FIBER-REACTIVE AZO DYES, METHODS FOR THEIR PREPARATION AND USE THEREOF FOR DYEING HYDROXY-AND/OR CARBOXAMIDO-CONTAINING FIBER MATERIAL

(75) Inventors: Ronald Pedemonte, Wesley Chapel, NC (US); Joachim Steckelberg, Brunsbuttel (DE); Werner Russ, Flörsheim-Wicker (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 10/639,082

(22) Filed: Aug. 12, 2003

(65) Prior Publication Data
US 2004/0049865 A1 Mar. 18, 2004

Related U.S. Application Data

(62) Division of application No. 10/026,505, filed on Dec. 19, 2001, now Pat. No. 6,623,534.
(60) Provisional application No. 60/259,193, filed on Dec. 29, 2000.

(51) Int. Cl.[7] .................... C09B 62/01; C09B 62/09; C09B 62/25; C09B 62/513
(52) U.S. Cl. .................. 534/634; 534/637; 534/642
(58) Field of Search ................ 534/634, 637, 534/642

(56) References Cited

U.S. PATENT DOCUMENTS

| | | | |
|---|---|---|---|
| 3,420,812 A | * 1/1969 | Langbein et al. | ........... 534/700 |
| 5,445,654 A | 8/1995 | Hussong et al. | |
| 5,456,728 A | 10/1995 | Schwarz et al. | |
| 5,611,821 A | 3/1997 | Huang et al. | |
| 5,849,887 A | 12/1998 | Lehmann et al. | |
| 5,989,298 A | 11/1999 | Lehmann | |
| 6,187,912 B1 | * 2/2001 | Steckelberg | ................ 534/635 |

FOREIGN PATENT DOCUMENTS

| | | |
|---|---|---|
| EP | 0 545 207 | 6/1993 |
| EP | 0 679 697 | 11/1995 |
| EP | 0 870 807 | 10/1998 |
| EP | 0 974 621 | 1/2000 |
| JP | 58-160362 | 9/1983 |
| KP | 94-2560 | 3/1994 |
| WO | WO-01/49791 | 7/2001 |

* cited by examiner

Primary Examiner—Fiona T. Powers
(74) Attorney, Agent, or Firm—Connolly Bove Lodge & Hutz LLP

(57) ABSTRACT

Deep black-dyeing dye mixtures comprising a disazo dye conforming to the general formula (1),

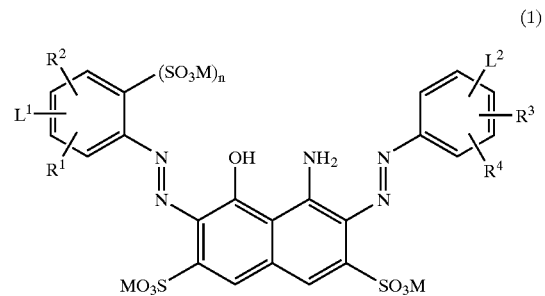

(1)

and one or more disazo dyes conforming to the general formula (2),

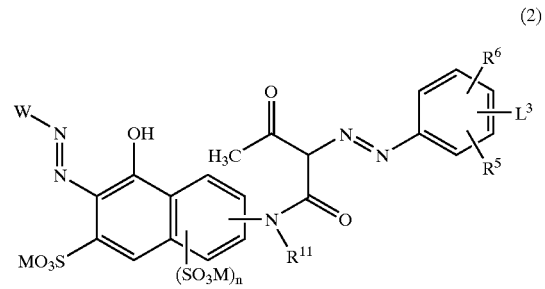

(2)

wherein the amide group is in the 6, 7, or 8 position relative to the hydroxy
group and wherein:
M, n, W, $R^1$, $R^2$, $R^3$, $R^4$, $R^5$, $R^{11}$, $L^1$, $L^2$, $L^3$ are as defined in claim 1 methods for their preparation and use thereof for dyeing hydroxyl- and/or carboxamido-containing fiber material.

9 Claims, No Drawings

BLACK DYE MIXTURES OF FIBER-REACTIVE AZO DYES, METHODS FOR THEIR PREPARATION AND USE THEREOF FOR DYEING HYDROXY-AND/OR CARBOXAMIDO-CONTAINING FIBER MATERIAL

This application is a division of Ser. No. 10/026,505 filed Dec. 19, 2001 now U.S. Pat. No. 6,623,534 which claims benefit of U.S. provisional 60/259,193 filed Dec. 29, 2000.

The present invention relates to the field of fiber-reactive dyes.

Black-dyeing mixtures of fiber-reactive dyes are known from U.S. Pat. Nos. 5,445,654 and 5,611,821 as well as from Korean Patent Application Publication No. 94-2560. Deep black dye mixtures are known, for example, from Japanese Patent Application Publication Sho-58-160 362 which are based on a navy-blue disazo dye and an orange monoazo dye. However these dye mixtures have some deficiencies.

With the present invention, deep black-dyeing dye mixtures of improved properties, for example wash fastnesses have unexpectedly been found, comprising a disazo dye conforming to the general formula (1),

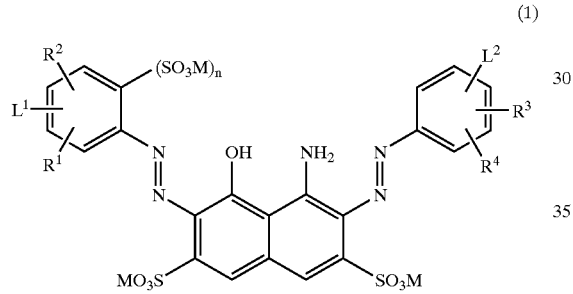

(1)

and one or more disazo dyes conforming to the general formula (2),

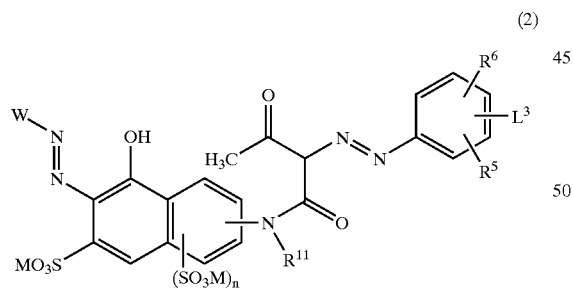

(2)

wherein:

M is hydrogen or an alkali metal, such as lithium, sodium and potassium;

n is in each case independently 0 or 1;

$R^1$ is hydrogen, methyl, methoxy, sulfo, cyano, or chloro preferably hydrogen;

$R^2$, $R^3$, $R^4$, $R^5$, $R^6$ have one of the meanings of $R^1$;

$R^{11}$ is hydrogen or alkyl or phenyl, which may be mono- or di-substituted by an alkyl, alkoxy, ester, ureido, carboxamido, hydroxy, chloro, cyano or sulfo group;

$L^1$ is a fiber-reactive group of the formulae (5a–d):

(5a)

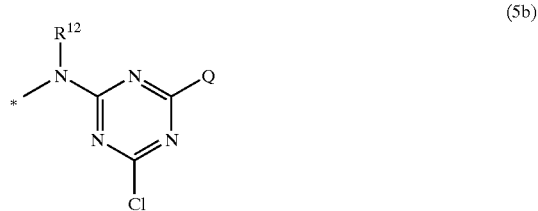

(5b)

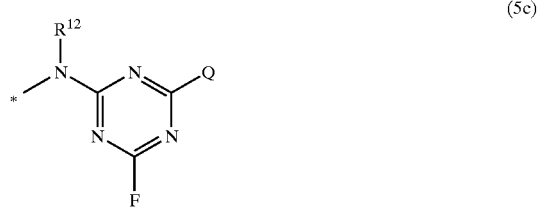

(5c)

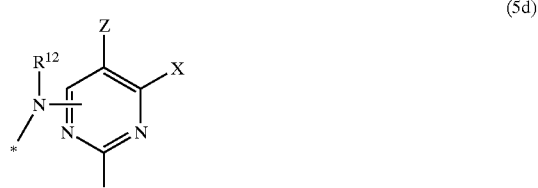

(5d)

wherein:

$R^{12}$ has one of the meanings of $R^{11}$;

Y is in each instance, independently of one another, vinyl or is ethyl which is substituted in the β-position by a substituent which can be eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and is preferably vinyl, β-chloroethyl, β-thiosulfatoethyl or β-sulfatoethyl and is in particular preferably vinyl or β-sulfatoethyl;

*— denotes the bond to the aromatic ring;

X denotes chloro or fluoro and

Z has one of the meanings of X or is hydrogen or cyano;

Q is chloro, fluoro, cyanamido, hydroxy, alkoxy of 1 to 4 carbon atoms, pyridino, carboxypyridino, carbamoylpyridino a group of the general formula W or is a group of the general formulae (6a) or (6b),

(6a)

(6b)

in which $R^{13}$ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo, acetamido, ureido and carboxy;

$R^{14}$ has one of the meanings given for $R^{13}$;

$R^{15}$ has one of the meanings given for $R^3$, or $R^{13}$ and $R^{14}$ form a cyclic ringsystem of the general formulae (6c) or (6d)

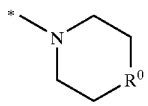

(6c)

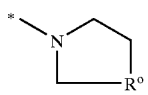

(6d)

wherein $R°$ is a heterogroup such as O, S, $SO_2$ or $NR^{12}$ or is a methylene group;

G is arylene, C1–C6-alkylene or alkylene-arylene, each unsubstituted or substituted, wherein the alkylene moieties being preferably those of 1 to 6 carbon atoms, preferably of 1 to 4 carbon atoms, in particular of 1 to 3 carbon atoms, such as methylene, ethylene and n-propylene, or being preferably of 2 to 6 carbon atoms, if interrupted by a hetero group, such as O, S, NH, $SO_2$, CO, CO—NH, NH—CO, arylene being phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups;

$L^2$, $L^3$ have one of the meanings of $L^1$;

W is a phenyl group of the general formula (3) or naphtyl group of the general formula (4)

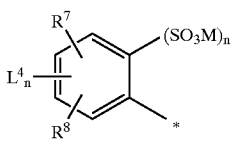

(3)

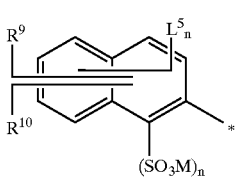

(4)

in which

M is defined as above;

* denotes the bond to the diazo group;

$R^7$, $R^8$, $R^9$, $R^{10}$ have one of the meanings of $R^1$;

n is in each case independently 0 or 1 and $L^4$, $L^5$ have one of the meanings of $L^1$.

Preference is given to dye mixtures comprising an amount of from 40 to 95% by weight of one or more disazo dyes of the general formula (1) and from 1 to 60% by weight of one or more disazo dyes of the general formula (2) based on the dye mixture.

Special preference is given to dye mixtures comprising an amount of from 60 to 80% by weight of one or more disazo dyes of the general formula (1) and from 20 to 40% by weight of one or more disazo dyes of the general formula (2) based on the dye mixture.

The groups "sulfo", "thiosulfato", "carboxy", "phosphato" and "sulfato" include both the acid form and the salt form of these groups. Accordingly, sulfo groups are groups of the formula —$SO_3M$, thiosulfato groups are groups of the formula —S—$SO_3M$, carboxy groups are groups of the formula —COOM, phosphato groups are groups of the formula —$OPO_3M_2$ and sulfato groups are groups of the formula —$OSO_3M$, in which M is defined as above.

The dye mixtures according to the present invention may also comprise one or more monoazo dye of the general formulae (7) or (8) in up to 5% by weight:

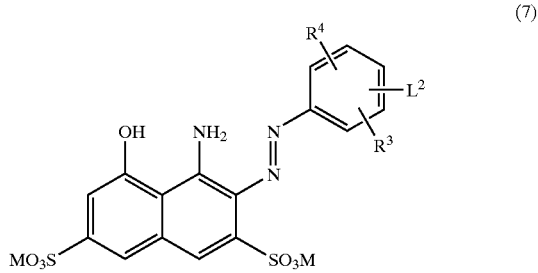

(7)

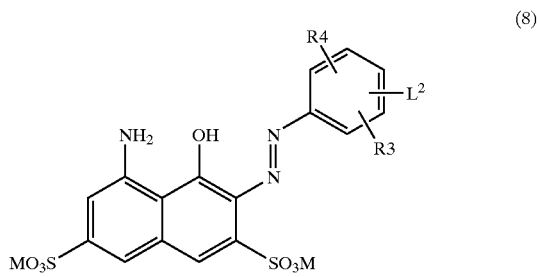

(8)

wherein M, $R^3$, $R^4$, and $L^2$ are as defined above.

In addition the dye mixtures may contain up to about 15% by weight of a commercially available red reactive dyestuff. These shading components are well known in the literature and can be synthesized by the standard methods. They are generally added as shading components. Examples of these are in particular dyes of the formulas (I), (II) or (III)

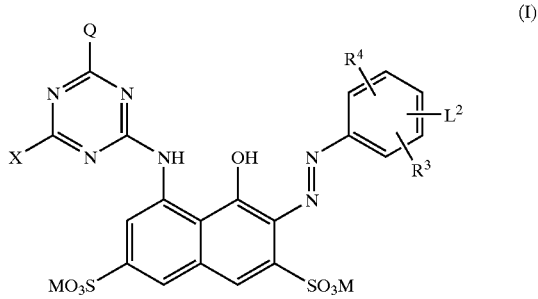

(I)

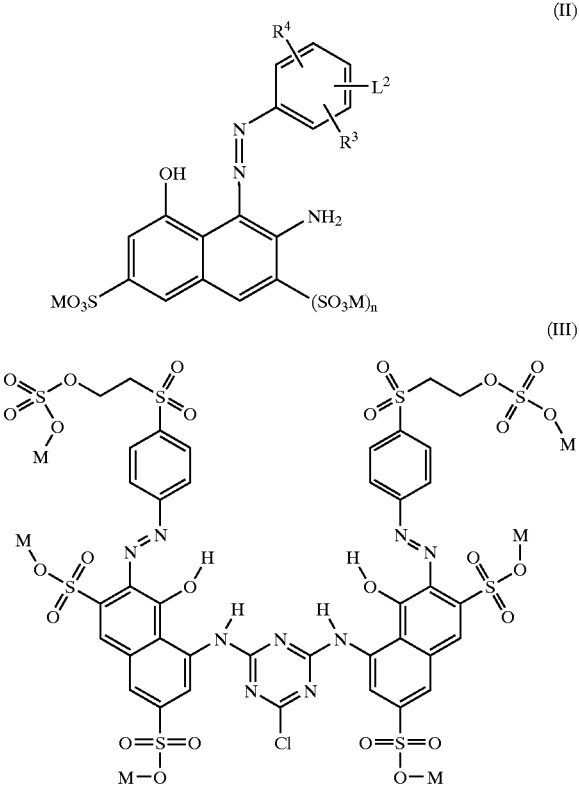

wherein
X, M, Q, $R^3$, $R^4$, $L^2$, n are as described above.

The dyes of the general formulae (1), (2), (7), (8), (I), (II), in particular if those corresponding to the same general formula, have the same chromophore, can have, within the meaning of Y, structurally different fiber-reactive groups —$SO_2$—Y. In particular, the dye mixture can contain dyes of the same chromophore conforming to the formula (1) and dyes of the same chromophore conforming to formula (2) and optionally likewise of the general formula (7) and (8) in which the fiber-reactive groups —$SO_2$—Y are partly vinylsulfonyl groups and partly groups in which Y is a β-ethyl substituted group as defined above, such as β-chloroethylsulfonyl, β-thiosulfatoethylsulfonyl or, preferably, β-sulfatoethylsulfonyl groups. If the dye mixtures contain the respective dye components in the form of a vinylsulfonyl dye, the proportion of the respective vinylsulfonyl dye to the respective dye with Y being a β-ethyl substituted group as defined above, such as a β-chloro- or β-thiosulfato- or β-sulfatoethyl-sulfonyl dye, will be up to about 30 mol-%, based on the respective dye chromophore. Preference is here given to the dye mixtures in which the proportion of vinylsulfonyl dye to said β-ethyl substituted dye, such as β-sulfatoethylsulfonyl dye is in terms of the molar ratio between 5:95 and 30:70.

The dye mixtures of the invention can be present as a preparation in solid or liquid (dissolved) form. In solid form they generally contain the electrolyte salts customary in the case of water-soluble and in particular fiber-reactive dyes, such as sodium chloride, potassium chloride and sodium sulfate, and also the assistants customary in commercial dyes, such as buffer substances capable of establishing a pH in aqueous solution between 3 and 7, such as sodium acetate, sodium borate, sodium bicarbonate, sodium citrate, sodium dihydrogenphosphate and disodium hydrogenphosphate, small amounts of siccatives or, if they are present in liquid, aqueous solution (including the presence of thickeners of the type customary in print pastes), substances which ensure the permanence of these preparations, for example mold preventatives.

If the dye mixtures take the form of dye powders, they contain, as a rule, 10 to 60% by weight, based on the dye powder or preparation, of a strength-standardizing colorless diluent electrolyte salt, such as those mentioned above.

These dye powders may in addition contain the above mentioned buffer substances in a total amount of up to 10%, based on the dye powder. If the dye mixtures of the invention are present in aqueous solution, the total dye content of these aqueous solutions is up to about 75% by weight, the electrolyte salt content of these aqueous solutions preferably being below 10% by weight, based on the aqueous solutions (liquid preparations) can in general contain the above mentioned buffer substances in an amount of up to 10% by weight, preferably up to 5% by weight.

The disazo dyes of the general formula 2 are new if the amide group is in the 6 position relative to the hydroxyl group and the —$SO_3M$ group is in the 5 position relative to the hydroxyl group, as given in general formula (2-1), (2-1)

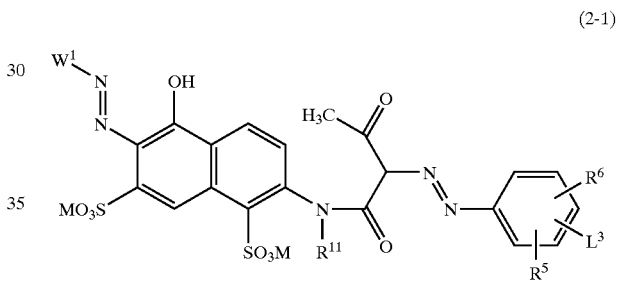

or if the amide group is in 7 position and the —$SO_3M$ group is in position 6 relative to the hydroxyl group, as given in general formula (2-2)

(2-2)

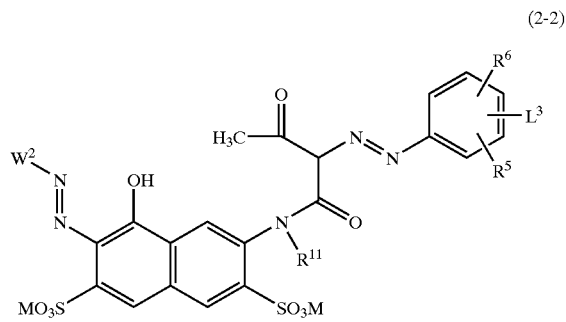

wherein

M is hydrogen or an alkali metal, such as lithium, sodium and potassium;

$R^5$, $R^6$ is hydrogen, methyl, methoxy, sulfo, cyano, or chloro preferably hydrogen;

$R^{11}$ is hydrogen or alkyl or phenyl, which may be mono- or di-substituted by an alkyl, alkoxy, ester, ureido, carboxamido, hydroxy, chloro, cyano or sulfo group;

$L^3$ is a fiber-reactive group of the formulae (5a–d):

(5a)

Y—SO$_2$
  \
   *

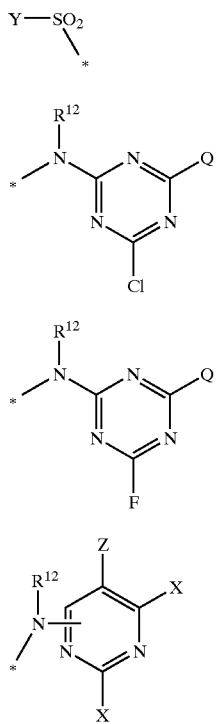

(5b)

(5c)

(5d)

wherein:

$R^{12}$ has one of the meanings of $R^{11}$;

Y is in each instance, independently of one another, vinyl or is ethyl which is substituted in the β-position by a substituent which can be eliminated by the action of an alkali, forming the vinyl group, such as chlorine, thiosulfato, sulfato, alkanoyloxy of 2 to 5 carbon atoms, such as acetyloxy, phosphato, sulfobenzoyloxy and p-toluylsulfonyloxy, and is preferably vinyl, β-chloroethyl, β-thiosulfatoethyl or β-sulfatoethyl and is in particular preferably vinyl or β-sulfatoethyl;

*— denotes the bond to the aromatic ring;

X denotes chloro or fluoro and

Z has one of the meanings of X or is hydrogen or cyano;

Q is chloro, fluoro, cyanamido, hydroxy, alkoxy of 1 to 4 carbon atoms, pyridino, carboxypyridino, carbamoylpyridino a group of the general formula W or is a group of the general formulae (6a) or (6b), (6a)

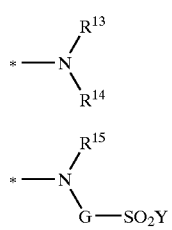

(6b)

in which $R^{13}$ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo, acetamido, ureido and carboxy;

$R^{14}$ has one of the meanings given for $R^{13}$;

$R^{15}$ has one of the meanings given for $R^{13}$, or $R^{13}$ and $R^{14}$ form a cyclic ring system of the general formulae (6c) or (6d)

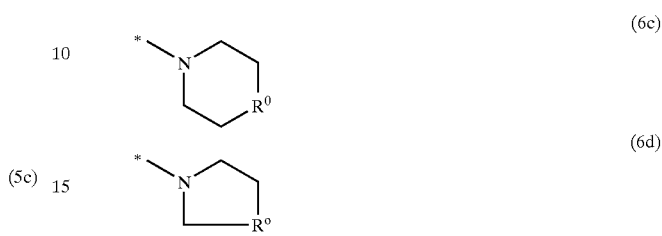

wherein $R^o$ is a hetero group such as O, S, SO$_2$ or $NR^{12}$ or is a methylene group;

G is arylene, C1–C6-alkylene or alkylene-arylene, each unsubstituted or substituted, wherein the alkylene moieties being preferably those of 1 to 6 carbon atoms, preferably of 1 to 4 carbon atoms, in particular of 1 to 3 carbon atoms, such as methylene, ethylene and n-propylene, or being preferably of 2 to 6 carbon atoms, if interrupted by a hetero group, such as O, S, NH, SO$_2$, CO, CO—NH, NH—CO, arylene being phenylene or naphthylene, the substituents of phenylene being preferably 1 or 2 substituents selected from the group consisting of alkyl of 1 to 4 carbon atoms, such as methyl and ethyl, alkoxy of 1 to 4 carbon atoms, such as methoxy and ethoxy, carboxy, sulfo and chlorine, in particular thereof methyl, ethyl, methoxy and ethoxy, and the substituents of naphthylene being preferably 1 or 2 sulfo groups;

$W^1$ is a phenyl group of the general formula (3) or naphtyl group of the general formula (4)

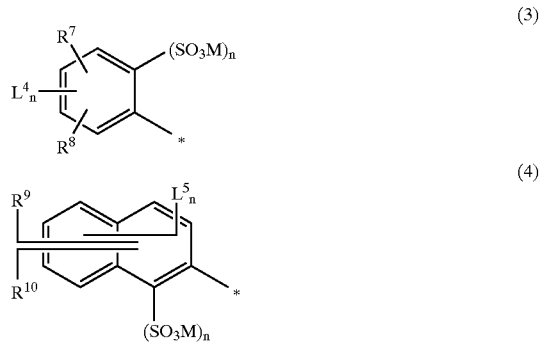

in which

M is defined as above;

* denotes the bond to the diazo group;

$R^7$, $R^8$, $R^9$, $R^{10}$ are hydrogen, methyl, methoxy, sulfo, cyano, or chloro;

n is in each case independently 0 or 1 and $L^4$, $L^5$ have one of the meanings of $L^3$.

$W^2$ is a phenyl group of the general formula (3') or naphtyl group of the general formula (4')

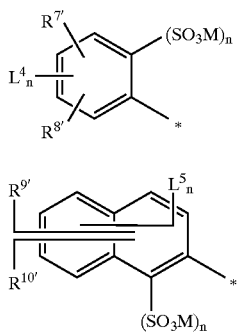

(3')

(4')

in which

M is defined as above;

* denotes the bond to the diazo group;

$R^{7'}$, $R^{8'}$ are hydrogen, methoxy, methyl $R^{9'}$, $R^{10'}$ is hydrogen methyl, methoxy, sulfo, cyano;

n is in each case independently 0 or 1 and $L^4$, $L^5$ have one of the meanings of $L^3$.

and are thus part of the invention.

The dye mixtures of the invention can be obtained in a conventional manner, for instance by mechanically mixing the individual dyes in the required proportions or by synthesis by means of the customary diazotization and coupling reactions using appropriate mixtures of the diazo and coupling components in a manner familiar to those skilled in the art and the necessary proportions. One option is for example to prepare aqueous suspensions of the coupling components 1-amino-8-naphthol-3,6-disulfonic acid and for example 1-hydroxy-3,5-disulfo-6-N-(1',3'-diketobutyl)-naphtylamine, and as diazo components, aniline compounds of the formula (9).

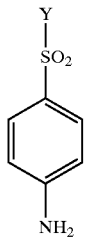

(9)

Thus the dye mixture can be produced by diazotizing 4-(β-sulfatoethylsulfonyl)-aniline (9) in a conventional manner in a strongly acid medium and then carrying out the coupling reaction of the 1-amino-8-napthol-3,6-disulfonic acid with the diazo component at a pH below 1.5 to form the compound (7). The second coupling reaction with the monoazo dye (7) giving the disazo dyes conforming to the formula (1) is carried out at a pH between 3 and 6.5. Then, by addition of the aqueous solution of the acetoacetylated napthylamine the coupling reaction to form the dye conforming to the general formula (2) is carried out at a pH between 1 and 6.5. The inventive dyestuff mixture can be isolated from the solution in the conventional manner, for example by salting out with an electrolyte salt, such as sodium chloride or potassium chloride, or by spray-drying.

The acetoacetylated coupling agents employed are readily obtained by reaction of the appropiately substituted naphtylamines with an excess of 5–200% of diketene in aqueous solution between 0–60° C., preferably between 30–50° C. and at a pH between 3 and 11 preferably at pH 4 to 8. The resulting acetoacetylated products can subsequently be used directly for the diazo coupling reaction or can be isolated by conventional salting out or spray drying. If the reaction solutions are used directly, excess acylating agent can be removed by heating to approximately 80° C.

Dyes of the general formula (2) wherein the azo moieties are of a different structure are prepared preferably by diazotizing the aromatic amine having the structure

wherein W is as defined above and coupling the resulting diazo-compound to the naphtylamine of the formula (10)

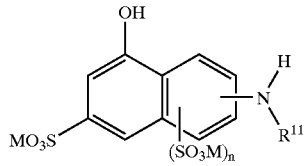

(10)

wherein M, $R^{11}$ and n are defined as above and then acetoacetylating the intermediate as described above with subsequent coupling with a second diazo at the 1,3-diketo moiety.

Dye mixtures in which the dye chromophores contain for example not only a β-chloroethylsulfonyl or β-thiosulfatoethylsulfonyl or β-sulfatoethylsulfonyl group but also proportions with vinylsulfonyl groups cannot only be prepared by the above mentioned method using appropriate vinylsulfonyl starting anilines, but also by reacting the dye mixture in which Y is a β-chloroethyl, β-thiosulfatoethyl, or β-sulfatoethyl radical with an amount of alkali required for only part of these groups and converting part said β-substituted ethylsulfonyl groups into vinylsulfonyl groups. This reaction is carried out by generally known methods of converting β-substituted ethylsulfonyl groups into the vinylsulfonyl group.

The dye mixtures of the instant invention are well suitable for dyeing (which includes printing) hydroxyl- and/or carboxamido-containing fiber materials by the application and fixing methods numerously described in the art for fiber-reactive dyes, in deep black shades with good color build-up and good wash-off in respect of unfixed dye portions. Moreover, the dyeings obtained show improved washfastness.

The present invention therefore also provides for use of the inventive dye mixtures for dyeing (including printing) hydroxyl- and/or carboxamido-containing fiber materials and processes for dyeing such fiber materials and processes for dyeing such materials using a dye mixture according to the invention by applying the dye mixture to the substrate in dissolved form and fixing the dyes on the fiber by the action of an alkali or by heating or both.

Hydroxyl-containing materials are natural or synthetic hydroxyl-containing materials, for example cellulose fiber materials, including in the form of paper, or their regenerated products and polyvinyl alcohols. Cellulose fiber materials are preferably cotton but also other natural vegetable fibers, such as linen, hemp, jute and ramie fibers; regenerated cellulose fibers are for example staple viscose and filament viscose.

Carboxamido-containing materials are for example synthetic and natural polyamides and polyurethanes, in particular in the form of fibers, for example wool and other animal hairs, silk, leather, nylon-6,6, nylon-6, nylon-11, and nylon-4.

Application of the dye mixtures of the invention is by generally known processes for dyeing and printing fiber materials by the known application techniques for fiber-reactive dyes. Since the dyes of the dye mixtures according to the invention are highly compatible with one another, the dye mixtures of the invention are also advantageously useful in exhaust dyeing processes. Applied in this way for example to cellulose fibers from a long liquor ratio at temperatures between 40 and 105° C., optionally at temperatures up to 130° C., under superatmospheric pressure, and optionally in the presence of customary dyeing assistants with the use of acid-binding agents and optionally neutral salts, such as sodium chloride or sodium sulfate, they produce dyeings in very good color yields with excellent color build-up and consistent shade. One possible procedure is to introduce the material into the warm bath, gradually heat the bath to the desired dyeing temperature, and complete the dyeing process at that temperature. The neutral salts which speed up the exhaustion of the dyes can also if desired not be added to the bath until the actual dyeing temperature has been reached.

Similarly, the conventional printing processes for cellulose fibers, which can either be carried out in single-phase, for example by printing with a print paste containing sodium bicarbonate or some other acid-binding agent and the colorant, and subsequent steaming at from 100 to 103° C., or in two phases, for example by printing with a neutral or weakly acid print paste containing the colorant and subsequent fixation either by passing the printed material through a hot electrolyte-containing alkaline bath or by overpadding with an alkaline electrolyte-containing padding liquor and subsequent batching of this treated material or subsequent steaming or subsequent treatment with dry heat, produce strong prints with well defined contours and a clear white ground. Changing fixing conditions has only little effect on the outcome of the prints. Not only in dyeing but also in printing the degrees of fixation obtained with dye mixtures of the invention are very high. The hot air used in dry heat fixing by the customary thermofix processes has a temperature of from 120 to 200° C. In addition to the customary steam at from 101 to 103° C., it is also possible to use superheated steam and high pressure steam at up to 160° C.

Acid-binding agents responsible for fixing the dyes to cellulose fibers are for example water-soluble basic salts of alkali metals and of alkaline earth metals of inorganic or organic acids, and compounds which release alkali when hot. Of particular suitability are the alkali metal hydroxides and alkali metal salts of weak to medium inorganic or organic acids, the preferred alkali metal compounds being the sodium and potassium compounds. These acid-binding agents are for example sodium hydroxide, potassium hydroxide, sodium carbonate, sodium bicarbonate, potassium carbonate, sodium formate, sodium dihydrogenphosphate and disodium hydrogenphosphate.

Treating the dyes of the dye mixtures according to the invention with the acid-binding agents with or without heating bonds the dyes chemically to the cellulose fiber; especially the dyeings on cellulose, after they have been given the usual aftertreatment of rinsing to remove unfixed dye portions, show excellent wet fastness properties, in particular since the unfixed dye portions are readily washed off because of their good cold water solubility.

The dyeings of polyurethane and polyamide fibers are customarily carried out from an acid medium. The dyebath may contain for example acetic acid and/or ammonium sulfate and/or acetic acid and ammonium acetate or sodium acetate to bring it to the desired pH. To obtain a dyeing of acceptable levelness it is advisable to add customary leveling assistants, for example based on a reaction product of cyanuric chloride with three times the molar amount of an aminobenzenesulfonic acid or aminonaphthalenesulfonic acid or based on a reaction product of for example stearylamine with ethylene oxide. In general the material to be dyed is introduced into the bath at a temperature of about 40° C. and agitated therein for some time, the dyebath is then adjusted to the desired weakly acid, preferably weakly acetic acid, pH, and the actual dyeing is carried out at temperature between 60 and 98° C. However, the dyeings can also be carried out at the boil or at temperatures up to 120° C. (under superatmospheric pressure).

The examples which follow illustrate the invention. Parts and percentages are by weight, unless otherwise stated. The parts by weight bear the same relation to parts by volume as the kilogram to the liter.

EXAMPLE 1

1a) 186 parts of diketene are added to a neutral aqueous solution of 319 parts of 6-amino-3,5-disulfo-1-naphtol in 1000 parts of water at 25 to 45° C. and a pH of 5 to 7, with thorough stirring; stirring of the mixture is then continued for about another two hours at 25 to 45° C. At room temperature the product of the formula (1-a)

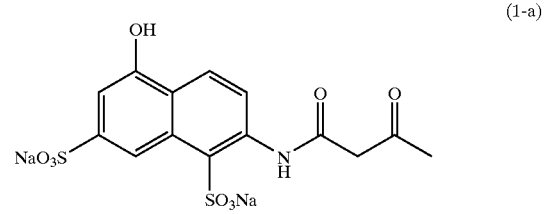

(1-a)

is isolated by addition of salt and subsequent filtration.

1b) In a separate batch, 562 parts of 4-(β-sulfatoethylsulfonyl)-aniline are diazotized with 138 parts of sodium nitrite and 700 parts of a 31% strength aqueous hydrochloric acid in the customary manner at about 0° C. in 1500 parts of water, with the addition of about 700 parts of ice, excess nitrous acid is destroyed with amidosulfonic acid.

1c) To the diazonium salt suspension obtained in example 1b) the product described in example 1a) is added under thorough stirring. The coupling reaction is carried out at a temperature of 15 to 20° C. and a pH between 2 and 5.

When the coupling reaction is complete, the disazo compound according to the invention, of the formula

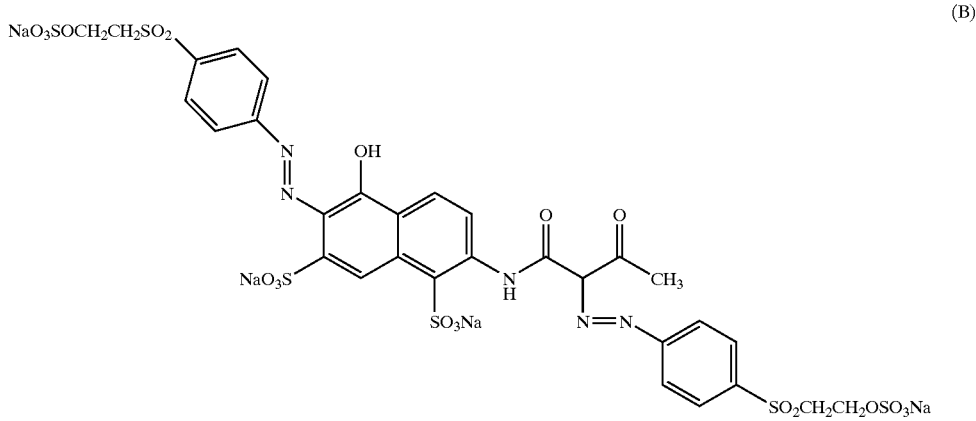

(B)

is isolated. It has very good fiber-reactive dyestuff properties and dyeing properties on fiber materials mentioned in the description, in particular cellulose fiber materials, such as cotton, in orange shades with good fastness properties and a very low dependence of shade and strengths on the dyeing temperature.

The compound of formula (R) is isolated by spray drying. It has good fiber-reactive dyestuff properties and dyes the fiber materials mentioned in the description, in particular cellulose fiber materials, such as cotton, in dull scarlet shades with good fastness properties.

EXAMPLE 2

2a) 341 parts of 2,5-dimethoxy-4-(β-sulfatoethylsulfonyl)-aniline are diazotized with 69 parts of sodium nitrite and 350 parts of 31% aqueous hydrochloric acid at 0° C. in customary manner in 1000 parts of water.

2b) To prepare a disazo compound according to the invention, the procedure according to example 1 is carried out, but instead of the product described in example 1b) compound 2a) is employed.

The inventive disazo compound obtained has the formula

Similar to the methods described in examples 1 and 2 the following dyestuff corresponding to the general formula (2) were prepared:

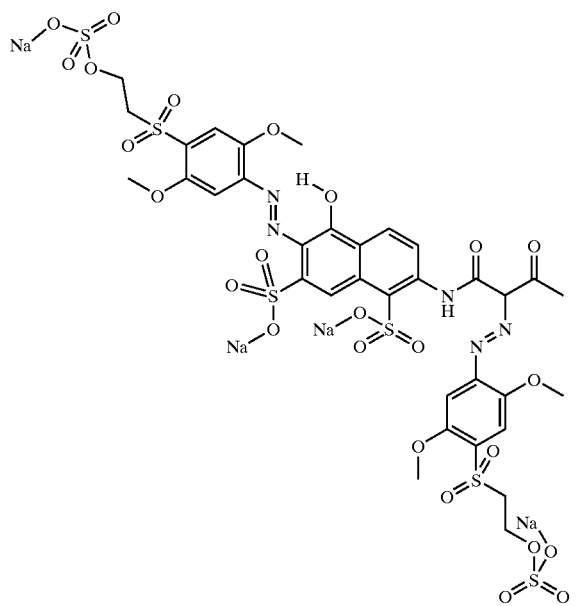

(R)

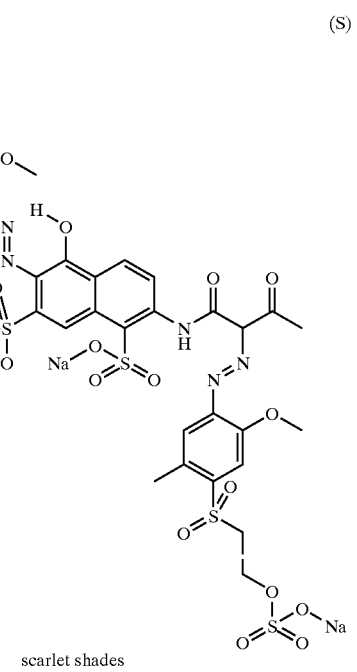

(S)

scarlet shades

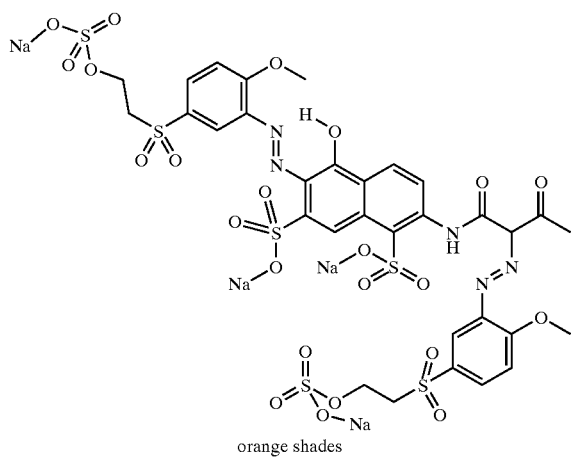
(T) orange shades
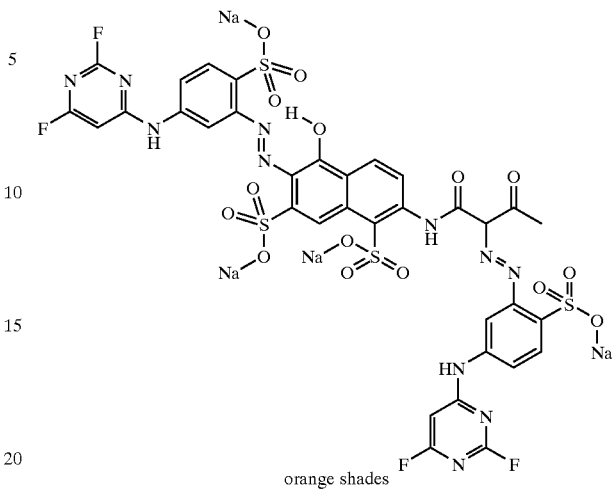
(U) orange shades
The coupling compound used to prepare the dyes mentioned in the examples (V) to (Y), was prepared in a way analogously to example 1a. The dyes (V) to (Y) were prepared analogously to examples 1 and 2.
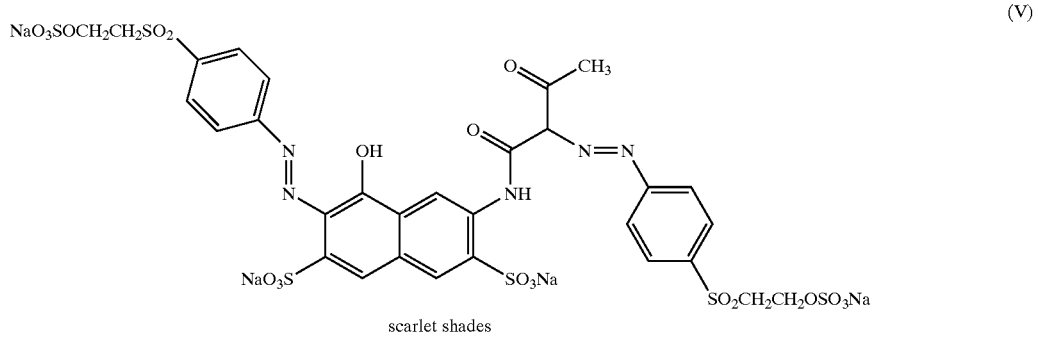
(V) scarlet shades
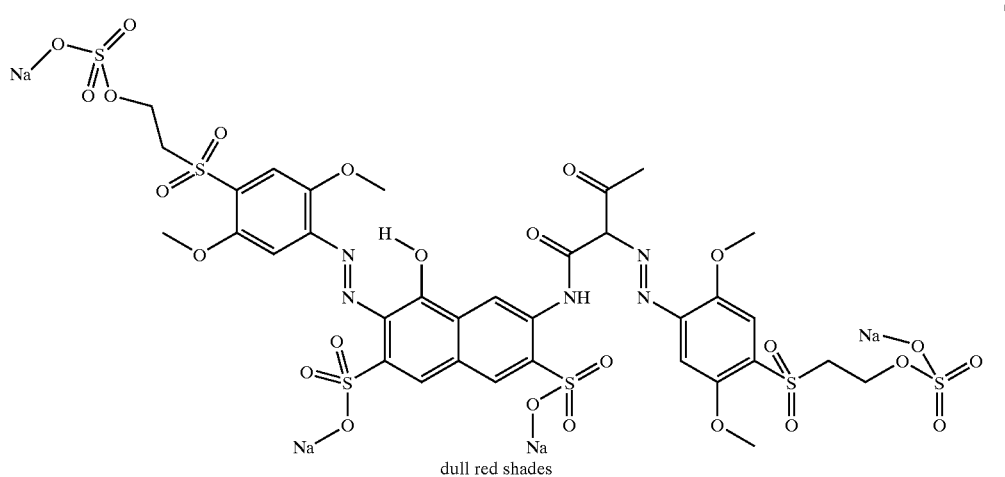
(W) dull red shades

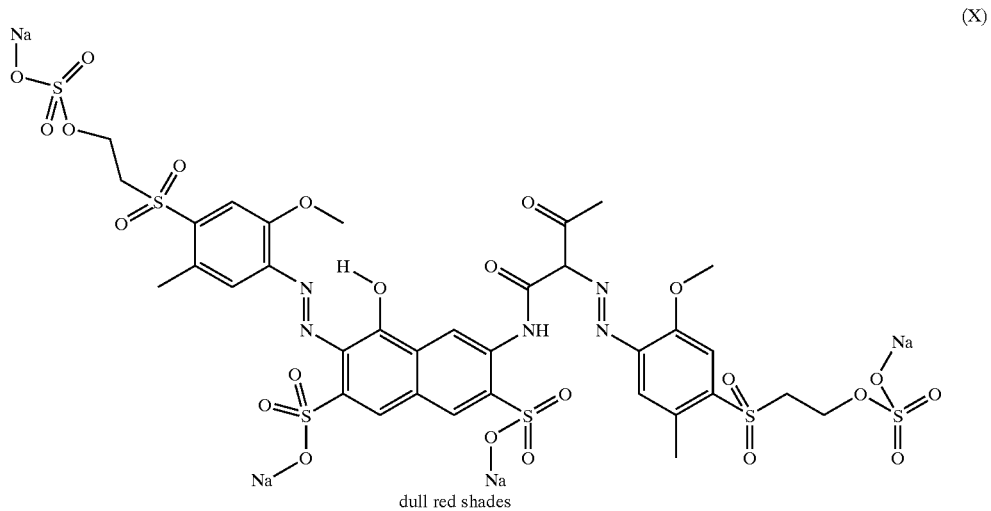
(X)
dull red shades
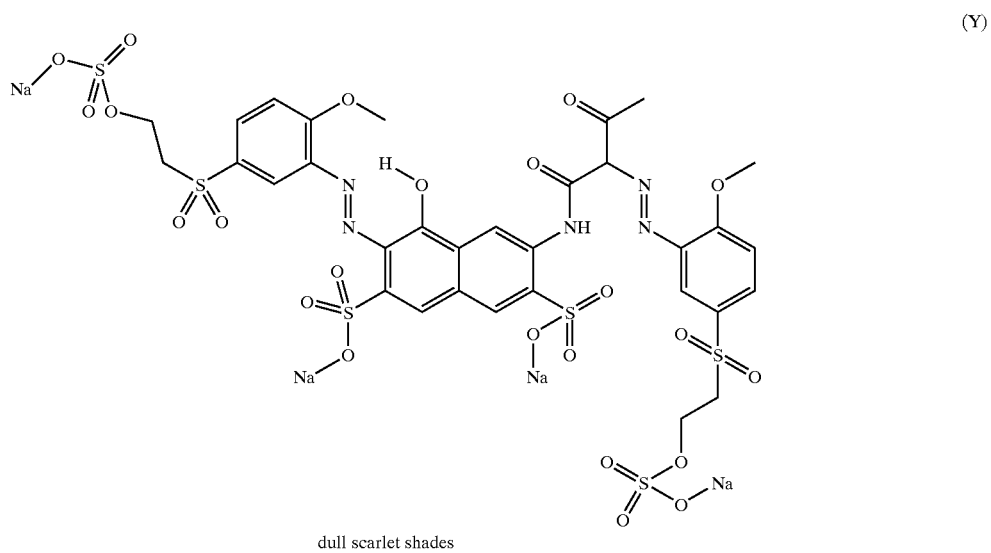
(Y)
dull scarlet shades
EXAMPLE 3
200 parts of an electrolyte-containing dye powder which contains the navy-dyeing disazo dye of the formula (A) in a proportion of 50% are mixed with 75 parts of an electrolyte-containing dye powder which contains the orange-dyeing dye of the formula (B) in a 50% proportion
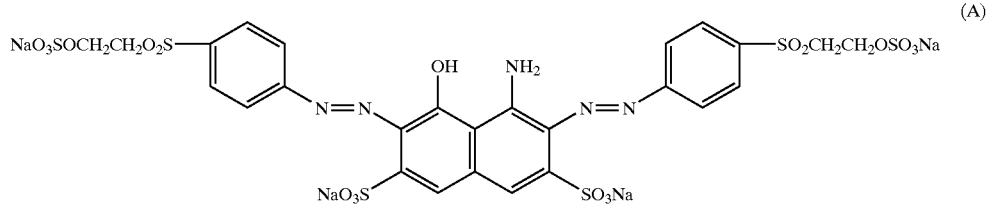
(A)

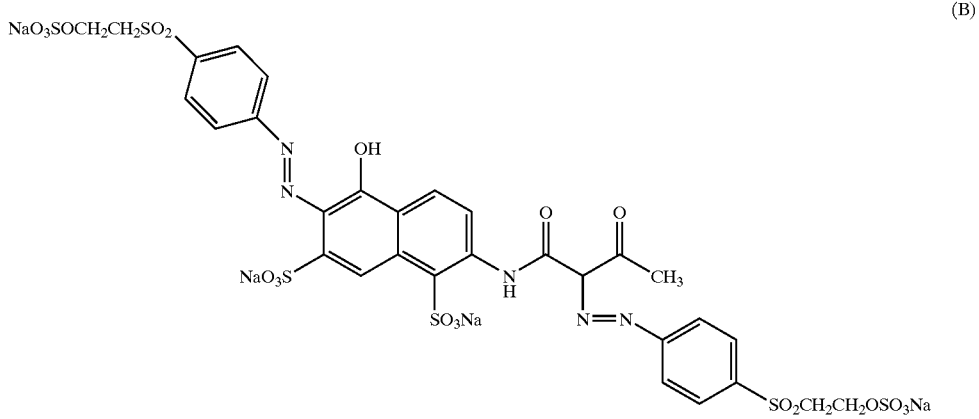

(B)

The resulting dye mixture according to the invention, when employed according to the application and fixing methods customary in the art for fiber-reactive dyes, produces for example on cellulose fiber materials dyeings and prints in deep black shades.

EXAMPLE 4

4a) 281 parts 4-(2-sulfatoethyl)-sulfonyl-aniline are dissolved at pH 6,8 in 1000 parts water by addition of sodium bicarbonate, 69 parts sodium nitrite are added hereto and the solution is added dropwise to a mixture of 300 parts concentrated hydrochloric acid and 500 parts ice. Sulfamic acid is added to destroy excess nitrite to the resulting reaction mixture.

4b) 319 parts 6-amino-3,5-disulfo-1-naphtol are dissolved in 1000 parts water at pH 8 by addition of 20% sodium hydroxide solution. At 40° C. are added dropwise 168 parts diketene. The mixture is stirred for 1 hour and the pH is kept at 4–6. At room temperature the product is isolated by addition of salt and subsequent filtration.

4c) 20% of the presscake isolated under 4b) are suspended in 1000 parts water and 115 parts 3,6-disulfo-8-amino-1-naphtol are added hereto. The pH is adjusted to about 1 with sulfuric acid and the diazo synthesized under 4a) is added hereto. After 3 hours the pH is slowly raised to 6.5 by addition of 10% sodium bicarbonate solution. The solution is spray dried to afford the claimed mixture of dyestuffs (A) and (B) in a ratio of about 6:4.

EXAMPLE 5

5a) 303 parts 1,5-disulfo-2-naphtylamin are diazotized as described under example 4a). The diazo-compound is added to a neutral solution of 6-amino-3,5, -disulfo-1-naphtol. The reaction mixture is neutralized with lithium hydroxide solution. The coupling reaction yields a solution of compound (C):

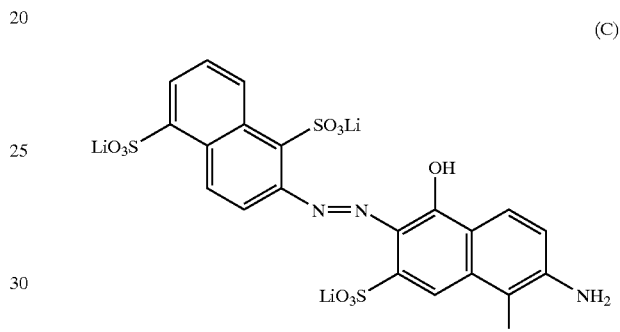

(C)

5b) The solution of compound (C) is treated with 120 parts of diketene at 40° C. to afford the N-acetoacetylated product (D), which is isolated by drying in vacuo at elevated temperature.

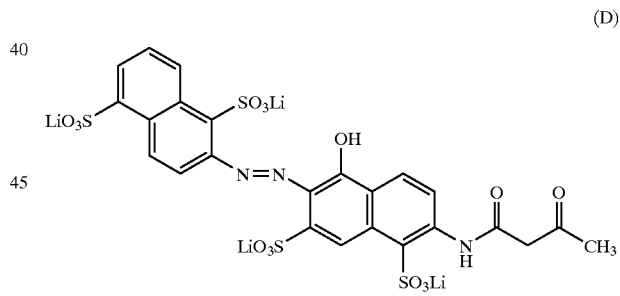

(D)

5c) 606 parts of the condensation product of 1,3-diamino-4-phenylsulfonic acid and 2,4,6-trifluoropyrimidine are diazotized according to the method given in 4a) using 140 g of sodium nitrite and 600 parts hydrochloric acid. A mixture of 611 parts of dyestuff (7-3)

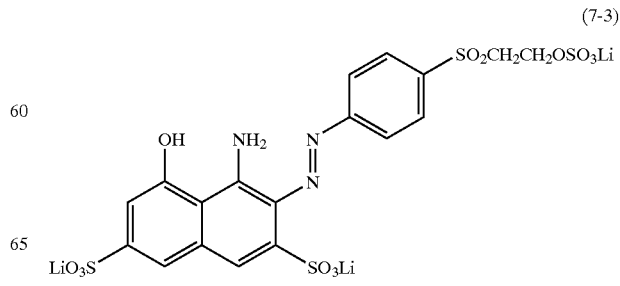

(7-3)

and the product made as described in 5b) are dissolved in 1000 parts of water. At pH 6–7 th diazo is pumped into the coupler solution to afford a 1:1 mixture of dyestuffs (E) and (F):

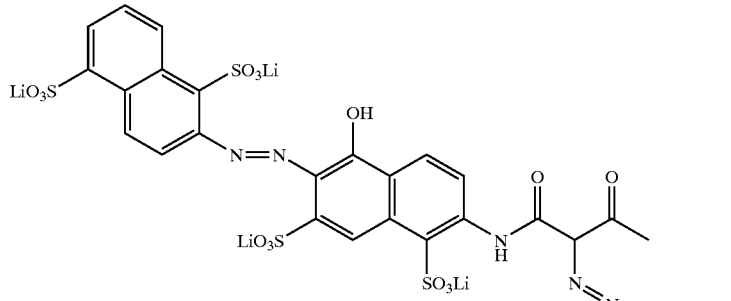

(E)

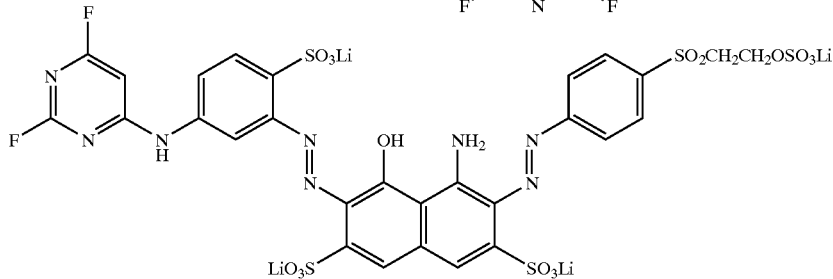

(F)

To this reaction mixture is added 15% of dyestuff (A) to afford a deep black dyeing mixture.

EXAMPLE 6

To the mixture given in example 5 are added 10% by weight of the well known red reactive dye (G) to afford a reddish deep black dyeing at 8% dyeing strength.

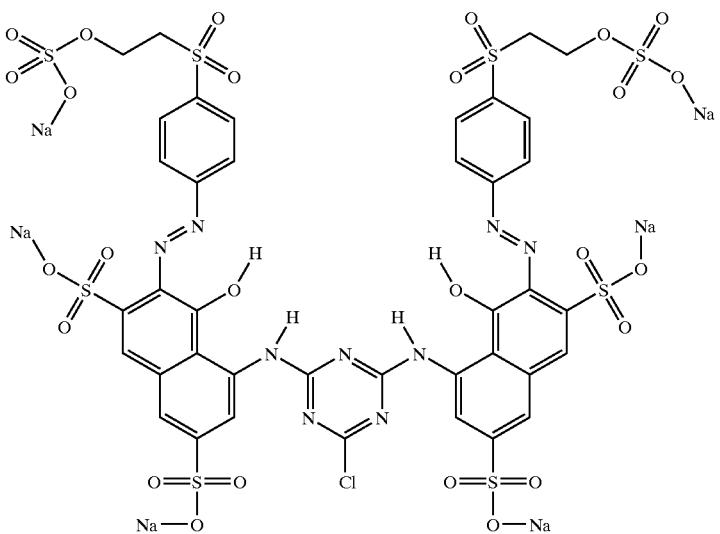

(G)

(H)
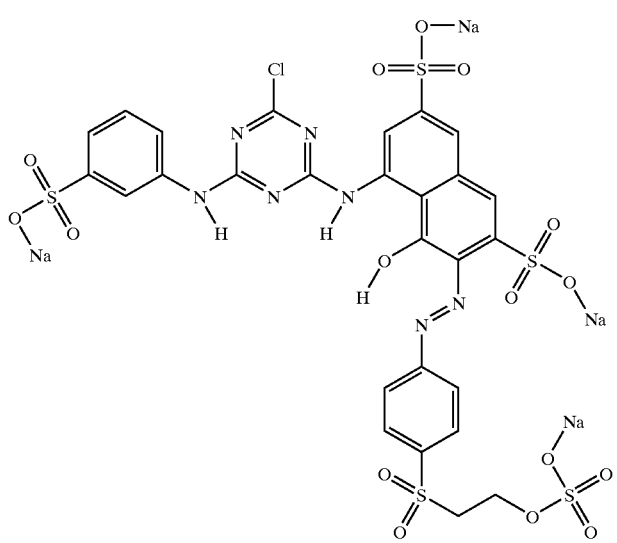
EXAMPLES 7 TO 99
Similar to the methods described in the examples 1–4 and the methods given in the patents mentioned in the description the following dyestuffs where prepared and mixed with one another in the ratios given in table 1 to afford deep navy to black dye mixtures with superior wash fastness even at dyeing depth greater than 8%
(I)
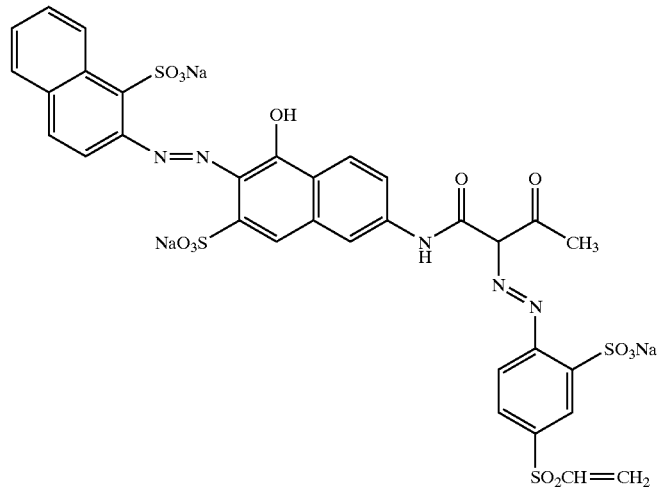
(J)
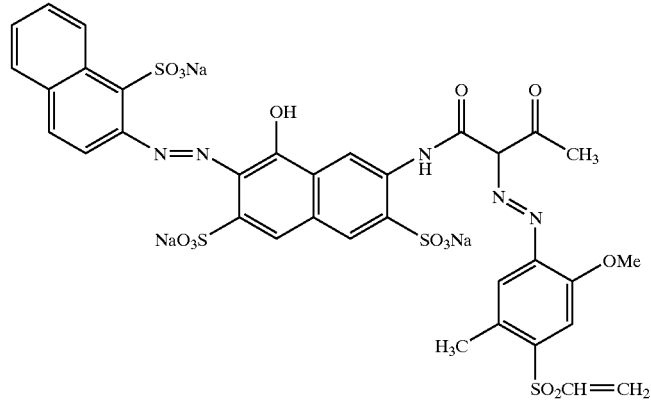

(K)
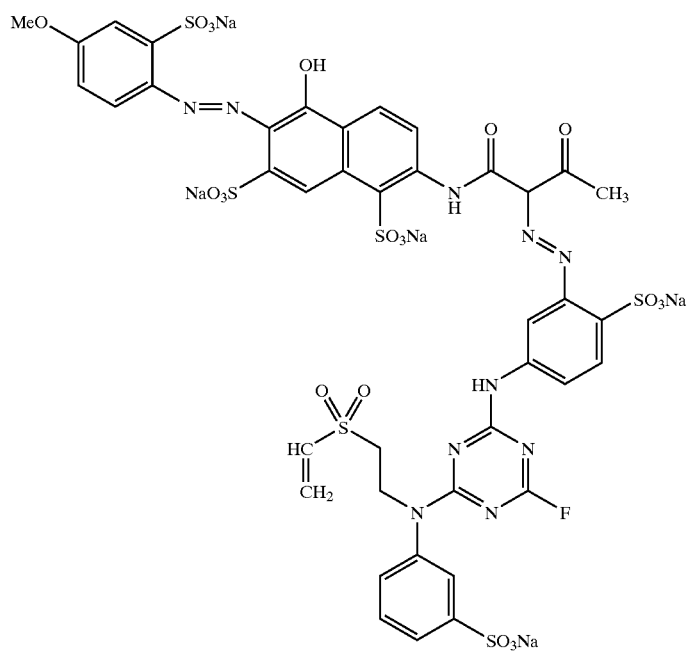
(L)
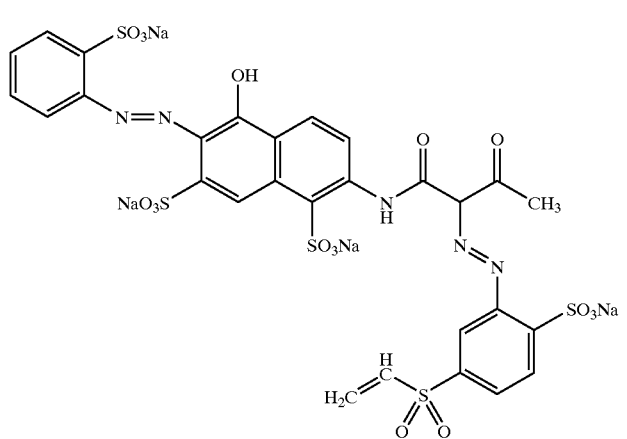
(M)
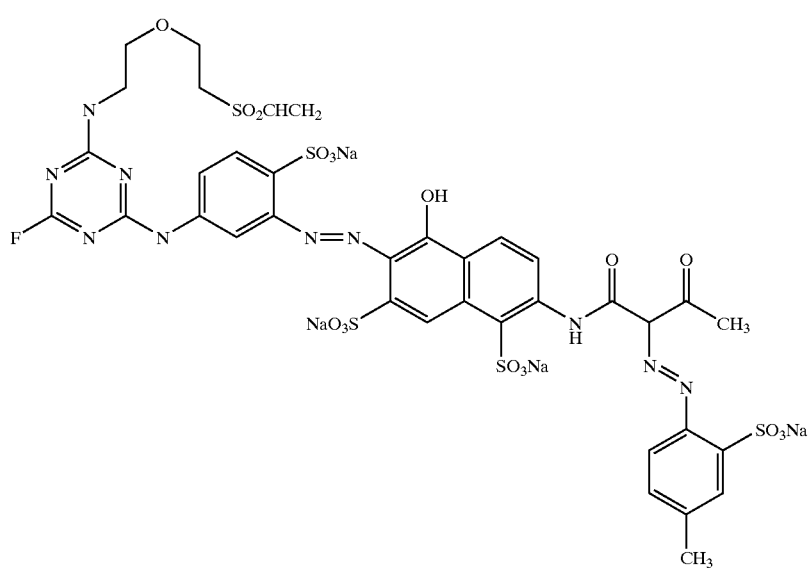

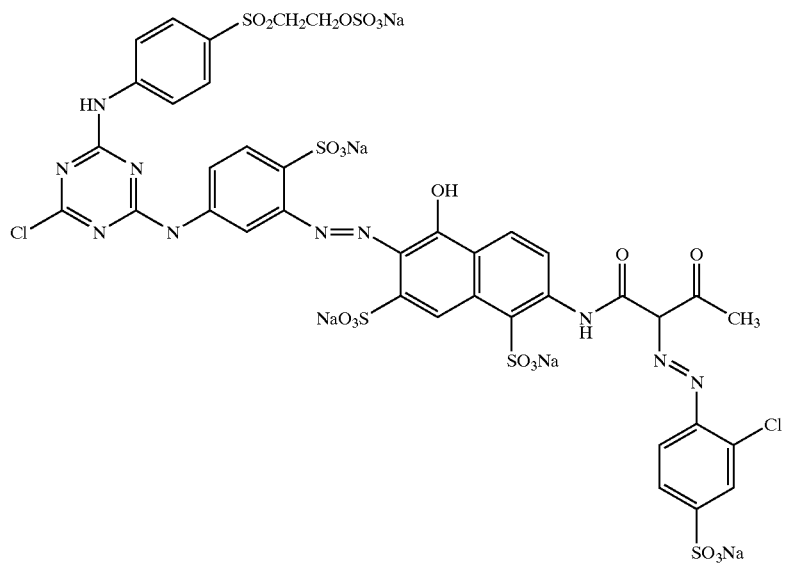
(N)
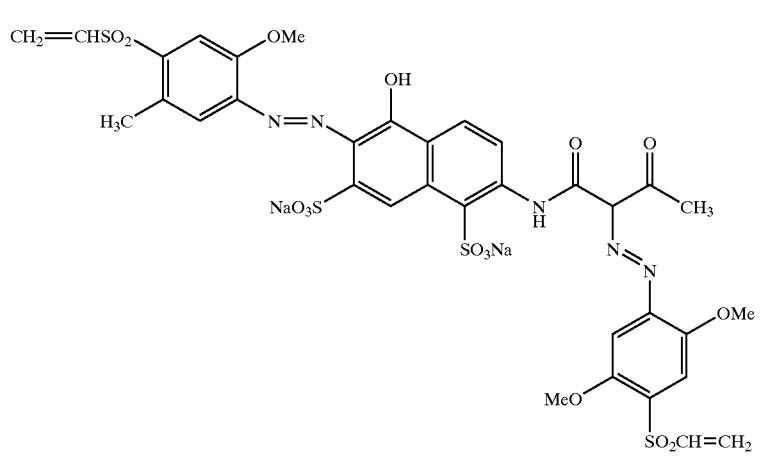
(O)
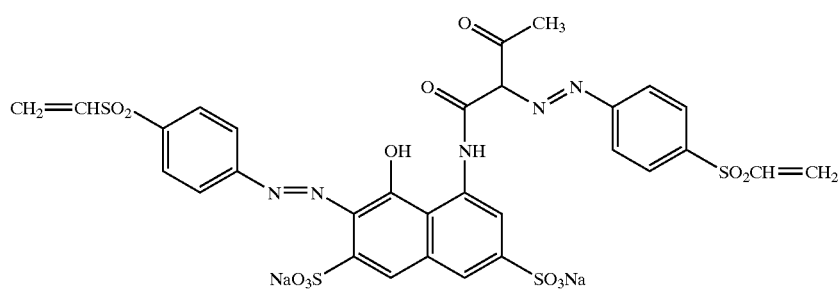
(P)
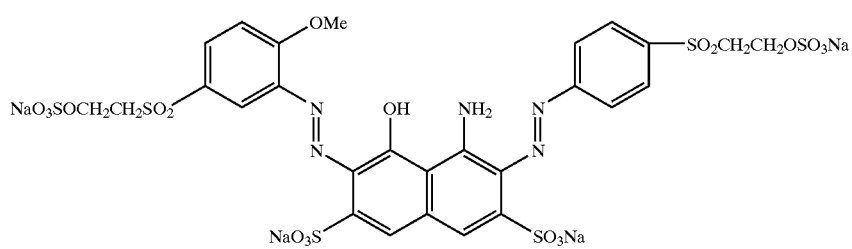
(AA)

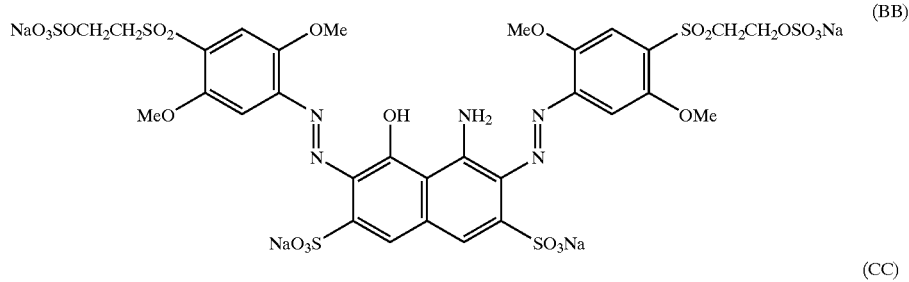
(BB)
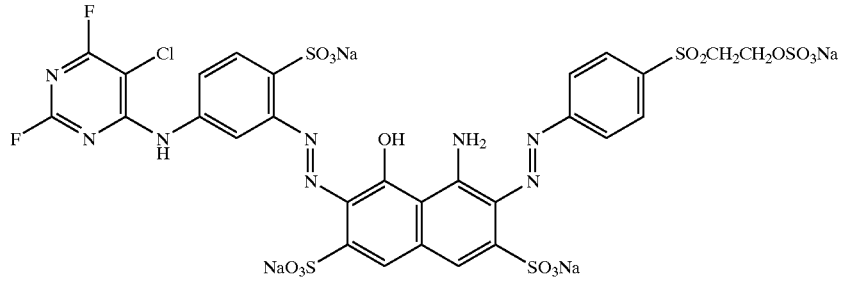
(CC)
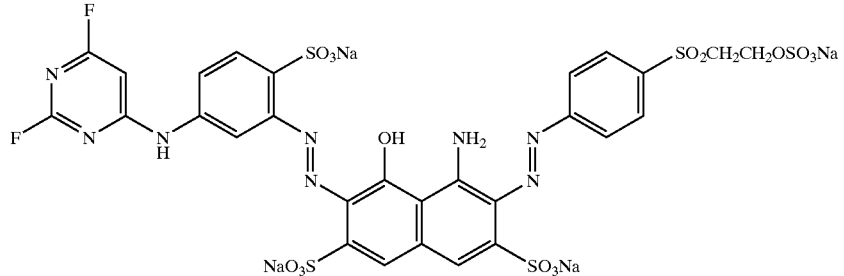
(DD)
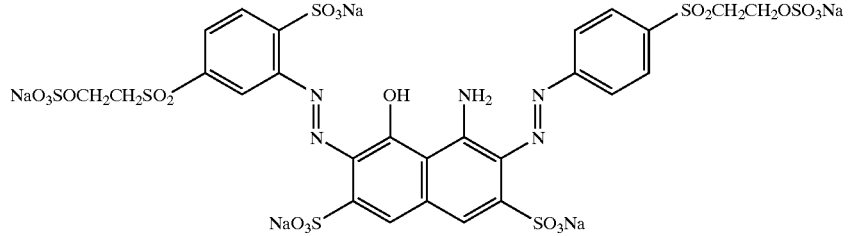
(EE)
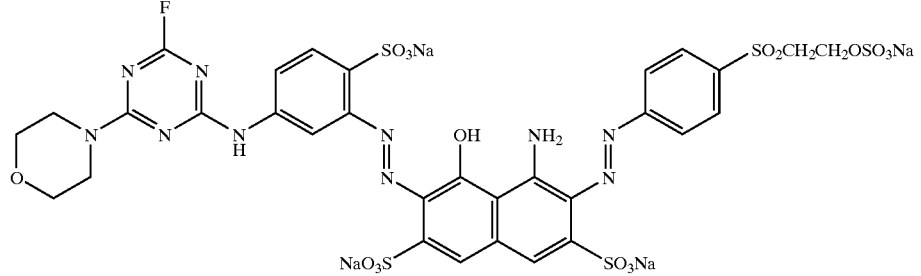
(FF)
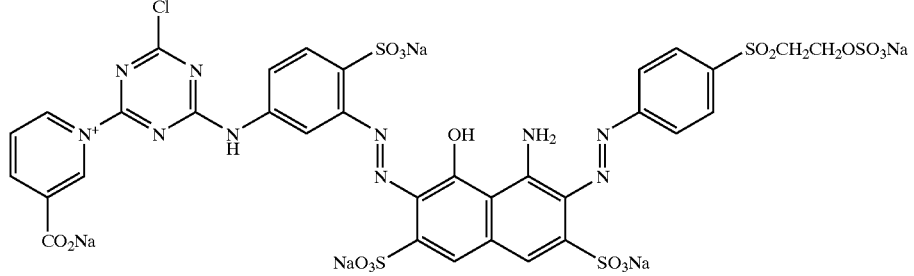
(GG)

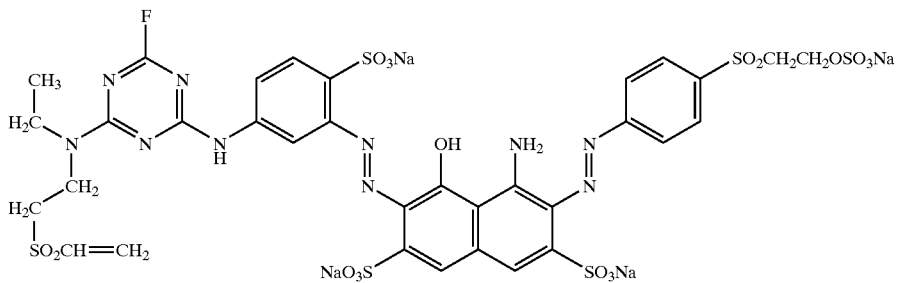

(HH)

Table 1

| Example | Navy dye | Orange dye | Ratio |
|---|---|---|---|
| 7 | A | B | 70:30 |
| 8 | A | B | 75:25 |
| 9 | A | B | 59:41 |
| 10 | A | E | 65:35 |
| 11 | A | E | 75:25 |
| 12 | A | J | 65:35 |
| 13 | A | K | 70:30 |
| 14 | A | L | 75:25 |
| 15 | A | M | 65:35 |
| 16 | A | N | 70:30 |
| 17 | A | O | 75:25 |
| 18 | A | P | 70:30 |
| 19 | A | V | 75:25 |
| 20 | AA | B | 75:25 |
| 21 | AA | E | 65:35 |
| 22 | AA | J | 70:30 |
| 23 | AA | K | 75:25 |
| 24 | AA | L | 65:35 |
| 25 | AA | M | 70:30 |
| 26 | AA | N | 75:25 |
| 27 | AA | O | 70:30 |
| 28 | AA | P | 75:25 |
| 29 | AA | V | 75:25 |
| 30 | BB | B | 65:35 |
| 31 | BB | E | 70:30 |
| 32 | BB | J | 75:25 |
| 33 | BB | K | 65:35 |
| 34 | BB | L | 70:30 |
| 35 | BB | M | 75:25 |
| 36 | BB | N | 70:30 |
| 37 | BB | O | 75:25 |
| 38 | BB | P | 70:30 |
| 39 | BB | V | 75:25 |
| 40 | CC | B | 75:25 |
| 41 | CC | E | 65:35 |
| 42 | CC | J | 70:30 |
| 43 | CC | K | 75:25 |
| 44 | CC | L | 65:35 |
| 45 | CC | M | 70:30 |
| 46 | CC | N | 75:25 |
| 47 | CC | O | 70:30 |
| 48 | CC | P | 75:25 |
| 49 | CC | V | 75:25 |
| 50 | DD | B | 65:35 |
| 51 | DD | E | 70:30 |
| 52 | DD | J | 75:25 |
| 53 | DD | K | 65:35 |
| 54 | DD | L | 70:30 |
| 55 | DD | M | 75:25 |
| 56 | DD | N | 70:30 |
| 57 | DD | O | 75:25 |
| 58 | DD | P | 70:30 |
| 59 | DD | V | 75:25 |
| 60 | EE | B | 75:25 |
| 61 | EE | E | 65:35 |
| 62 | EE | J | 70:30 |
| 63 | EE | K | 75:25 |
| 64 | EE | L | 65:35 |
| 65 | EE | M | 70:30 |
| 66 | EE | N | 75:25 |
| 67 | EE | O | 70:30 |
| 68 | EE | P | 75:25 |
| 69 | EE | V | 75:25 |
| 70 | FF | B | 65:35 |
| 71 | FF | E | 70:30 |
| 72 | FF | J | 75:25 |
| 73 | FF | K | 65:35 |
| 74 | FF | L | 70:30 |
| 75 | FF | M | 75:25 |
| 76 | FF | N | 70:30 |
| 77 | FF | O | 75:25 |
| 78 | FF | P | 70:30 |
| 79 | FF | V | 75:25 |
| 80 | GG | B | 75:25 |
| 81 | GG | E | 65:35 |
| 82 | GG | J | 70:30 |
| 83 | GG | K | 75:25 |
| 84 | GG | L | 65:35 |
| 85 | GG | M | 70:30 |
| 86 | GG | N | 75:25 |
| 87 | GG | O | 70:30 |
| 88 | GG | P | 75:25 |
| 89 | GG | V | 75:25 |
| 90 | HH | B | 65:35 |
| 91 | HH | E | 70:30 |
| 92 | HH | J | 75:25 |
| 93 | HH | K | 65:35 |
| 94 | HH | L | 70:30 |
| 95 | HH | M | 75:25 |
| 96 | HH | N | 70:30 |
| 97 | HH | O | 75:25 |
| 98 | HH | P | 70:30 |
| 99 | HH | V | 75:25 |
| 100 | A | R | 70:30 |
| 101 | A | R | 75:25 |
| 102 | A | R | 80:20 |
| 103 | A | S | 70:30 |
| 104 | A | S | 75:25 |
| 105 | A | S | 80:20 |

EXAMPLES 106 TO 113

Similar to the method described in the example (6) the following dyestuff mixtures where prepared in the ratios given in table 2 to afford deep navy to black dyeings with superior wash fastness even at dyeing depth greater than 8%

TABLE 2

| Example | Navy dye | Orange dye | Shading Compound | Ratio |
|---|---|---|---|---|
| 106 | A | B | G | 70:25:5 |
| 107 | A | B | G | 75:20:5 |

TABLE 2-continued

| Example | Navy dye | Orange dye | Shading Compound | Ratio |
|---|---|---|---|---|
| 108 | A | B | R | 80:15:5 |
| 109 | A | B | R | 70:25:5 |
| 110 | A | B | R | 75:20:5 |
| 111 | A | B | H | 70:25:5 |
| 112 | A | B | H | 75:20:5 |
| 113 | A | B | H | 80:15:5 |

What is claimed is:

1. A disazo dye of the formula (2)

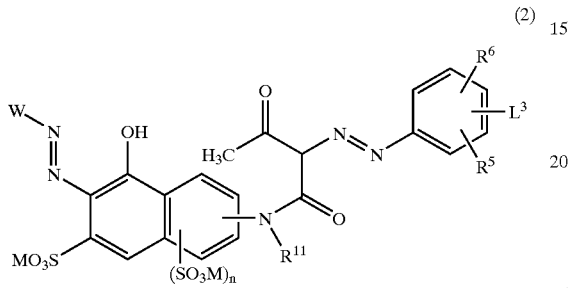

wherein

M is hydrogen or an alkali metal;

$R^5$ and $R^6$ are identical or different and are hydrogen, methyl, methoxy, sulfo, cyano or chloro;

$R^{11}$ is hydrogen or alkyl or phenyl, which is optionally mono- or di-substituted by an alkyl, alkoxy, ester, ureido, carboxamido, hydroxy, chloro, cyano of sulfo group;

$L^3$ is a fiber-reactive group of the formulae (5a–d):

(5a)

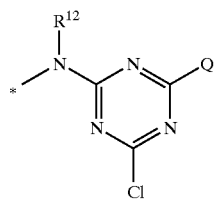
(5b)

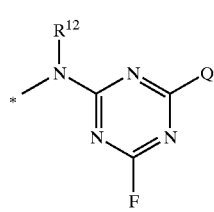
(5c)

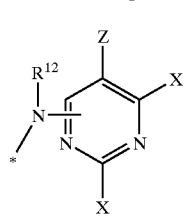
(5d)

wherein:

$R^{12}$ has one of the meanings of $R^{11}$;

Y is in each instance, independently of one another, vinyl or is ethyl which is substituted in the β-position by a substituent which is optionally eliminated by the action of an alkali, forming the vinyl group,

*— is the bond to the aromatic ring;

X is chloro or fluoro;

Z has one of the meanings of X, is hydrogen or cyano;

Q is chloro, fluoro, cyanamido, hydroxy, alkoxy of 1 to 4 carbon atoms, pyridino, carboxypyridino, carbamoylpyridino or is a group of the formulae (6a) or (6b),

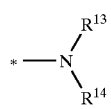
(6a)

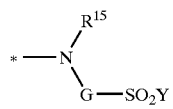
(6b)

in which $R^{13}$ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo, acetamido, ureido and carboxy;

$R^{14}$ has one of the meanings given for $R^{13}$;

$R^{15}$ has one of the meanings given for $R^{13}$, or $R^{13}$ and $R^{14}$ form a cyclic ring system of the formulae (6c) or (6d)

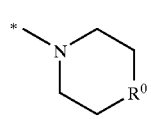
(6c)

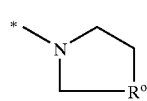
(6d)

wherein $R^o$ is a hetero group or a methylene group;

G is arylene, $C_1$–$C_6$-alkylene or alkylene-arylene, each unsubstituted or substituted or being alkylene of 2 to 6 carbon atoms, if interrupted by a hetero group, $W^1$ is naphthyl group of the formula (4)

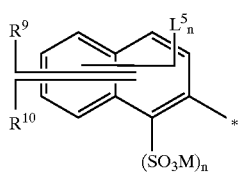
(4)

in which

M is defined as above;

* denotes the bond to the diazo group;

$L^9$ and $L^{10}$ are identical or different and are hydrogen, methyl, methoxy, sulfo, cyano, or chloro;

n is in each case independently 0 or 1; and m is 1 and $L^5$ has one of the meanings of $L^3$.

2. A disazo dye of the formula (2-1)

(2-1)

[Structure: naphthalene with W¹-N=N- at one position, OH, SO₃M, MO₃S substituents, and a -NH-C(=O)-CH(N=N-aryl)-C(=O)-CH₃ group with R¹¹ on N, and aryl bearing R⁵, R⁶, L³]

wherein

M is hydrogen or an alkali metal;

R⁵ and R⁶ are identical or different and are hydrogen, methyl, methoxy, sulfo, cyano or chloro;

R¹¹ is hydrogen or alkyl or phenyl, which is optionally mono- or di-substituted by an alkyl, alkoxy, ester, ureido, carboxamido, hydroxy, chloro, cyano of sulfo group;

L³ is a fiber-reactive group of the formulae (5a–d):

(5a) Y—SO₂—*

(5b) [triazine with R¹²N*, Q, Cl]

(5c) [triazine with R¹²N*, Q, F]

(5d) [pyrimidine with R¹²N*, Z, X, X]

wherein:

R¹² has one of the meanings of R¹¹;

Y is in each instance, independently of one another, vinyl or is ethyl which is substituted in the β-position by a substituent which is optionally eliminated by the action of an alkali, forming the vinyl group,

*— is the bond to the aromatic ring;

X is chloro or fluoro;

Z has one of the meanings of X, hydrogen or cyano;

Q is chloro, fluoro, cyanamido, hydroxy, alkoxy of 1 to 4 carbon atoms, pyridino, carboxypyridino, carbamoylpyridino or is a group of the formulae (6a) or (6b), (6a) *—N(R¹³)(R¹⁴)

(6b) *—N(R¹⁵)—G—SO₂Y in which

R¹³ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo, acetamido, ureido and carboxy;

R¹⁴ has one of the meanings given for R¹³;

R¹⁵ has one of the meanings given for R¹³, or

R¹³ and R¹⁴ form a cyclic ring system of the formulae (6c) of (6d)

(6c) [piperazine-like ring with *N and R⁰]

(6d) [pyrrolidine-like ring with *N and R⁰]

wherein

R⁰ is a hetero group or a methylene group;

G is arylene, C₁–C₆-alkylene or alkylene-arylene, each unsubstituted or substituted, or being alkylene of 2 to 6 carbon atoms, if interrupted by a hetero group, W¹ is a phenyl group of the formula (3) or naphthyl group of the formula (4)

(3) [phenyl with R⁷, R⁸, L⁴ₘ, (SO₃M)ₙ]

(4) [naphthyl with R⁹, R¹⁰, L⁵ₙ, (SO₃M)ₙ]

in which

M is defined as above;

* denotes the bond to the diazo group;

R⁷, R⁸, R⁹ and R¹⁰ are identical or different and are hydrogen, methyl, methoxy, sulfo, cyano, or chloro;

n is in each case independently 0 or 1;

m is 1 and

L⁴ and L⁵ are identical or different and have one of the meanings of L³.

3. A process for the preparation of the disazo dye as claimed in claim 2, which comprises diazotizing an aromatic amine having the structure

W¹—NH₂ wherein $W^1$ is a phenyl group of the formula (3) or naphthyl group of the formula (4)

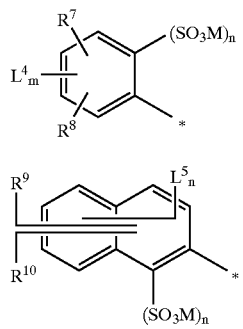

in which

M is hydrogen or an alkali metal;

* denotes the bond to the diazo group;

$R^7$, $R^8$, $R^9$ and $R^{10}$ are identical or different and are hydrogen, methyl, methoxy, sulfo, cyano, or chloro;

n is in each case independently 0 or 1;

m is 1;

$L^4$ and $L^5$ are identical or different and have one of the meanings of $L^3$; and coupling the resulting diazo-compound to the naphthylamine of the following formula

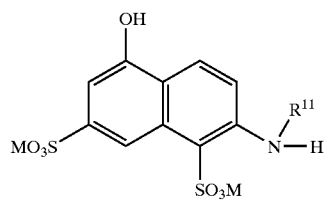

$R^{11}$ hydrogen or alkyl or phenyl, which is optionally mono- or di-substituted by an alkyl, alkoxy, ester, ureido, carboxamido, hydroxy, chloro, cyano of sulfo group;

wherein M and n are defined as above and then acetoacetylating the intermediate followed by subsequent coupling with a second diazo compound at the 1,3-diketo moiety.

4. The disazo dye according to claim 1, wherein

Y is in each instance, independently of one another, vinyl or is ethyl which is substituted in the β-position by a substituent which is optionally eliminated by the reaction of an alkali, forming the vinyl group wherein the substituent is selected from the group consisting of chlorine, thiosulfato, sulfato, alkanoyloxy of 2 to 5 carbon atoms, phosphato, sulfobenzoyloxy and p-toluylsulfonyloxy;

G is an arylene, $C_1$–$C_6$-alkylene, or alklene-arylene, each unsubstituted or substituted, or being alkylene of 2 to 6 carbon atoms, if interrupted by a hetero group, said hetero group selected from the group consisting of O, S, NH, $SO_2$, CO, CO—NH and NH—CO, arylene being phenylene or naphthene, the substituents of phenylene being selected from the group consisting of methyl, ethyl, methoxy, ethoxy, carboxy, sulfo and chlorine.

5. A disazo dye of the formula (2-2),

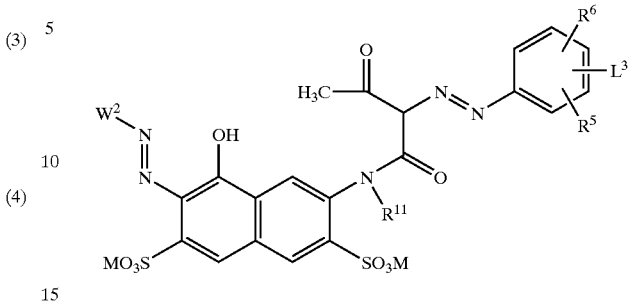

wherein

M is hydrogen or an alkali metal;

$R^5$ and $R^6$ are identical or different and are hydrogen, methyl, methoxy, sulfo, cyano, or chloro;

$R^{11}$ is hydrogen or alkyl or phenyl, which is optionally mono- or di-substituted by an alkyl, alkoxy, ester, ureido, carboxamido, hydroxy, chloro, cyano or sulfo group;

$L^3$ is a fiber-reactive group of the formulae (5a–d):

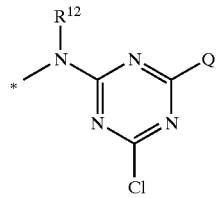

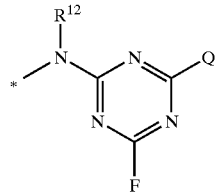

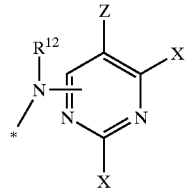

wherein $R^{12}$ has one of the meanings of $R^{11}$;

Y is in each instance, independently of one another, vinyl or is ethyl which is substituted in the β-position by a substituent which is optionally eliminated by the action of an alkali, forming the vinyl group,

*— is the bond to the aromatic ring;

X is chloro or fluoro and

Z has one of the meanings of X or is hydrogen or cyano;

Q is chloro, fluoro, cyanamido, hydroxy, alkoxy of 1 to 4 carbon atoms, pyridino, carboxypyridino, cabamoylpyridino or is a group of the formulae (6a) or (6b),

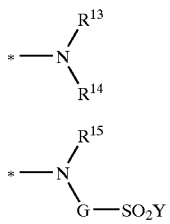
(6a)

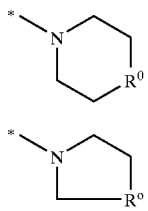
(6b)

in which
R$^{13}$ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substitutents selected from the group of substituents consisting of chlorine, bromine, methyl, ethyl, methoxy, sulfo, acetamido, ureido and carboxy;

R$^{14}$ has one of the meanings given for R$^{13}$;

R$^{15}$ has one of the meanings given for R$^{13}$, or

R$^{13}$ and R$^{14}$ form a cyclic ring system of the formula (6c) or (6d)

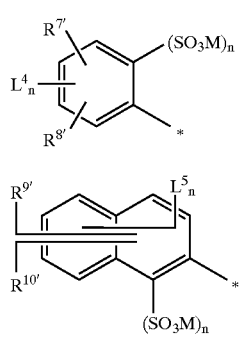
(6c)

(6d)

wherein
R$^{o}$ is a hetero group or a methylene group;
G is arylene, C$_1$–C$_6$-alkylene or alkylene-arylene, each unsubstituted or substituted, or being alkylene of 2 to 6 carbon atoms, if interrupted by a hetero group,
Y is in each instance, independently of one another, vinyl or is ethyl which is substituted in the β-position by a substituent which is optionally eliminated by the action of an alkali, forming the vinyl group,
W$^1$ is a phenyl group of the formula (3) or naphthyl group of the formula (4)

(3)

(4)

in which
M is defined as above;
* denotes the bond to the diazo group;
R$^7$, R$^8$, R$^9$, and R$^{10}$ are identical or different and are hydrogen, methyl, methoxy, sulfo, cyano, or chloro;
n is in each case independently 0 or 1;

m is 1 and
L$^4$ and L$^5$ are identical or different and have one of the meanings of L$^3$.

6. A process for the preparation of the disazo dye as claimed in claim 5, which comprises diazotizing the aromatic amine having the structure

W$^2$—NH$_2$ wherein
W$^2$ is defined in claim 4,
and coupling the resulting diazo-compound to the naphthylamine of the following formula

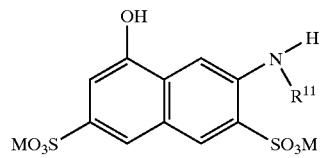

wherein M, R$^{11}$ and n are defined in claim 5, and then acetoacetylating the intermediate
followed by subsequent coupling with a second diazo at the 1,3-diketo moiety.

7. The disazo dye according to claim 4, wherein
Y is in each instance, independently of one another, vinyl or is ethyl which is substituted in the β-position by a substituent which is eliminated by the reaction of an alkali, forming the vinyl group wherein the substituent is selected from the group consisting of chlorine, thiosulfato, sulfato, alkanoyloxy of 2 to 5 carbon atoms, phosphato, sulfobenzoyloxy and p-toluylsulfonyloxy;

G is an arylene, C$_1$–C$_6$-alkylene or alkylene-arylene, each unsubstituted or substituted, or being alkylene of 2 to 6 carbon atoms, if interrupted by a hetero group selected from the group consisting of O, S, NH, SO$_2$, CO, CO—NH and NH—CO, arylene being phenylene or naphthylene, the substituents of phenylene being selected from the group consisting of methyl, ethyl, methoxy, ethoxy, carboxy, sulfo and chlorine; and R$^{o}$ is O, S, SO$_2$ or NHR$^{12}$ or is a methylene group.

8. A disazo dye of the formula (2)

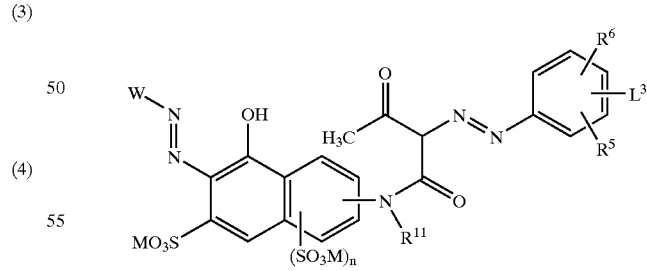
(2)

wherein
M is hydrogen or an alkali metal;
R$^5$ and R$^6$ are identical or different and are hydrogen, methyl, methoxy, sulfo, cyano or chloro;
R$^{11}$ is hydrogen or alkyl or phenyl, which is optionally mono- or di-substituted by an alkyl, alkoxy, ester, ureido, carboxamido, hydroxy, chloro, cyano of sulfo group;

$L^3$ is a fiber-reactive group of the formulae (5a–d):

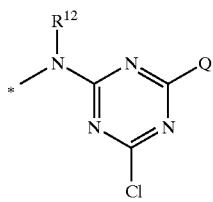
(5b)

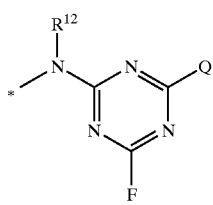
(5c)

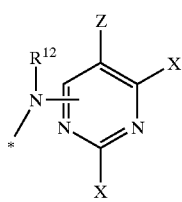
(5d)

wherein:
$R^{12}$ has one of the meanings of $R^{11}$;
*— is the bond to the aromatic ring;
X is chloro or fluoro;
Z has one of the meanings of X, hydrogen or cyano;
Q is chloro, fluoro, cyanamido, hydroxy, alkoxy of 1 to 4 carbon atoms, pyridino, carboxypyridino, carbamoylpyridino or is a group of the formulae (6a) or (6b),

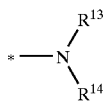
(6a)

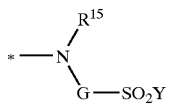
(6b)

in which
$R^{13}$ is hydrogen, alkyl of 1 to 4 carbon atoms, alkoxy of 1 to 4 carbon atoms, sulfoalkyl of 1 to 4 carbon atoms, phenyl unsubstituted or substituted by 1 to 2 substituents selected from the group of substituents consisting of chlorine, bromine, methyl, ethyl, methoxy, sulfo, acetamido, ureido and carboxy;
$R^{14}$ has one of the meanings given for $R^{13}$;
$R^{15}$ has one of the meanings given for $R^{13}$, or
$R^{13}$ and $R^{14}$ form a cyclic ring system of the formulae (6c) of (6d)

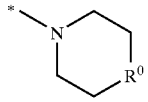

-continued

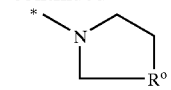

wherein
$R^o$ is a hetero group or a methylene group;
G is arylene, $C_1$–$C_6$-alkylene or alkylene-arylene, each unsubstituted or substituted, or being alkylene of 2 to 6 carbon atoms, if interrupted by a hetero group,
Y is in each instance, independently of one another, vinyl or is ethyl which is substituted in the βposition by a substituent which is optionally eliminated by the action of an alkali, forming the vinyl group,
$W^1$ is a phenyl group of the formula (3) or naphthyl group of the formula (4)

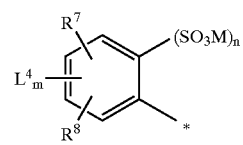
(3)

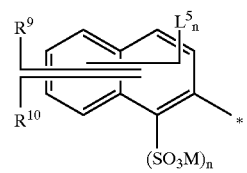
(4)

in which
M is defined as above;
* denotes the bond to the diazo group;
$R^7$, $R^8$, $R^9$ and $R^{10}$ are identical or different and are hydrogen, methyl, methoxy, sulfo, cyano, or chloro;
n is in each case independently 0 or 1;
m is 1 and
$L^4$ and $L^5$ are identical or different and have one of the meanings of $L^3$.

9. A disazo dye of the formula (I)

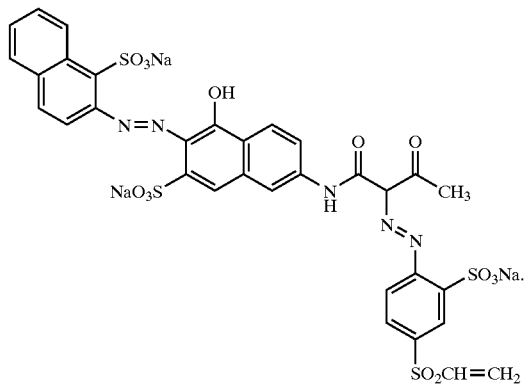
(I)

* * * * *

UNITED STATES PATENT AND TRADEMARK OFFICE
CERTIFICATE OF CORRECTION

PATENT NO.       : 6,870,035 B2
APPLICATION NO.  : 10/639082
DATED            : March 22, 2005
INVENTOR(S)      : Ronald Pedemonte et al.

It is certified that error appears in the above-identified patent and that said Letters Patent is hereby corrected as shown below:

In Claim 1, Col. 33 lines 15-25

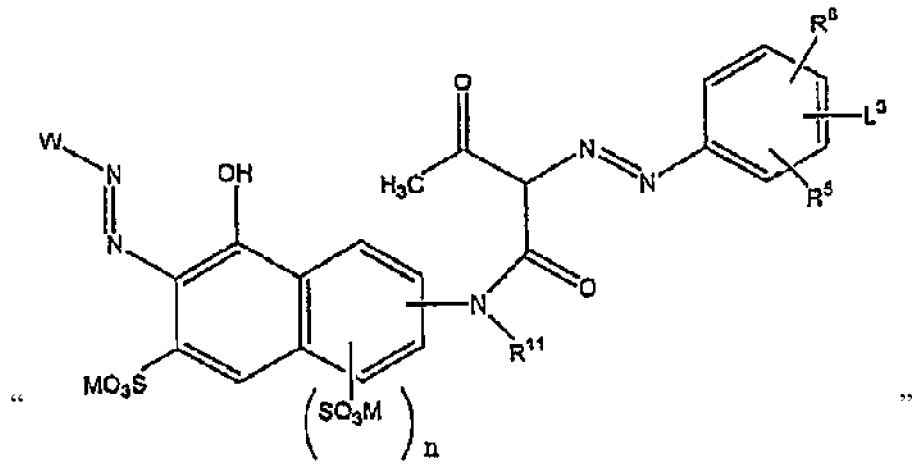

should read --

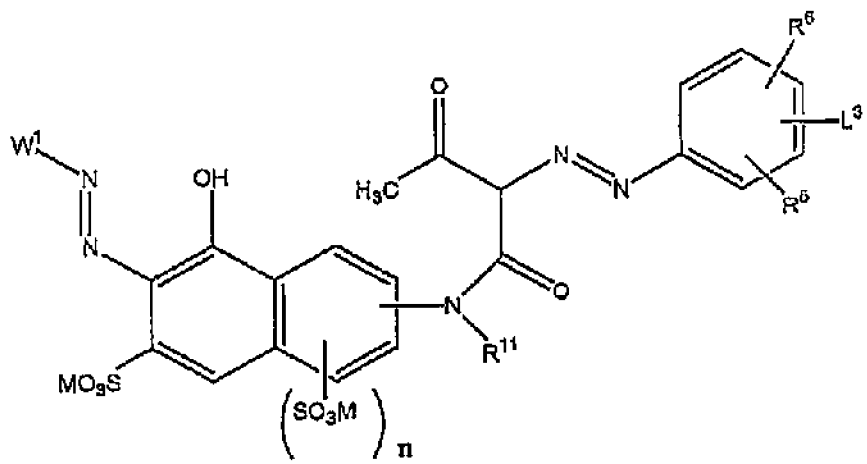

--.

UNITED STATES PATENT AND TRADEMARK OFFICE
CERTIFICATE OF CORRECTION

PATENT NO. : 6,870,035 B2
APPLICATION NO. : 10/639082
DATED : March 22, 2005
INVENTOR(S) : Ronald Pedemonte et al.

It is certified that error appears in the above-identified patent and that said Letters Patent is hereby corrected as shown below:

In Claim 1, Col. 34, line 7, "is hydrogen or cyano;" should read -- hydrogen or cyano;--.

In Claim 1, Col. 34, lines 50-60

"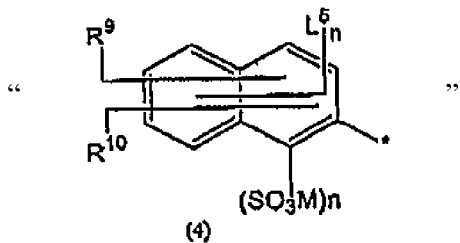"

should read
--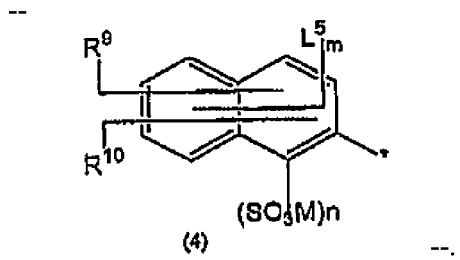 --.

In Claim 1, Col. 34, Line 63 "$L^9$ and $L^{10}$" should read -- $R^9$ and $R^{10}$ --.

In Claim 2, Col. 36, lines 45-55

"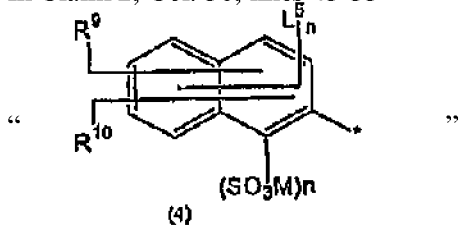"

should read
--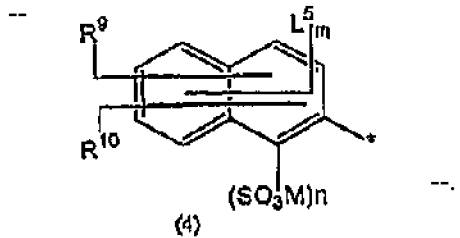 --.

UNITED STATES PATENT AND TRADEMARK OFFICE
CERTIFICATE OF CORRECTION

PATENT NO. : 6,870,035 B2
APPLICATION NO. : 10/639082
DATED : March 22, 2005
INVENTOR(S) : Ronald Pedemonte et al.

It is certified that error appears in the above-identified patent and that said Letters Patent is hereby corrected as shown below:

In Claim 5, Col. 39, line 36 "$R^0$ is a hetero or a methylene group;" should read -- $R^0$ is a hetero group;--.

In Claim 5, Col. 39, line 44 "$W^1$ is a phenyl group" should read -- $W^2$ is a phenyl group--.

In Claim 5, Col. 39, lines 53-60

" 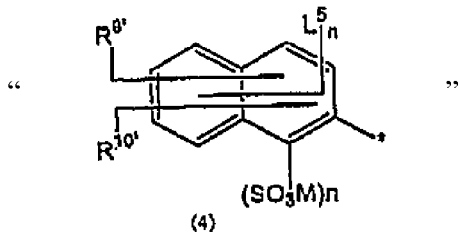 "

should read
--
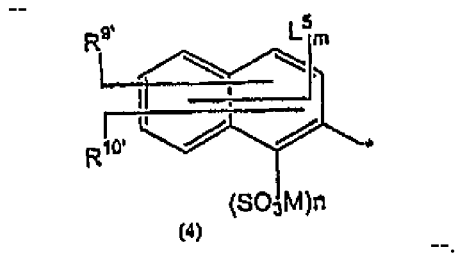
--.

In Claim 5, Col. 39, line 65 "$R^7$, $R^8$, $R^9$, $R^{10}$ are identical or different and are hydrogen, methyl, methoxy, sulfo, cyano, or chloro;" should read --

$R^{7'}$ and $R^{8'}$ are identical or different and are hydrogen, methoxy or methyl;

$R^{9'}$ and $R^{10'}$ are identical or different and are hydrogen methyl, methoxy, sulfo, or cyano; --.

UNITED STATES PATENT AND TRADEMARK OFFICE
CERTIFICATE OF CORRECTION

PATENT NO.       : 6,870,035 B2                                    Page 4 of 5
APPLICATION NO. : 10/639082
DATED            : March 22, 2005
INVENTOR(S)      : Ronald Pedemonte et al.

It is certified that error appears in the above-identified patent and that said Letters Patent is hereby corrected as shown below:

In Claim 8, Col. 40 lines 50-55

"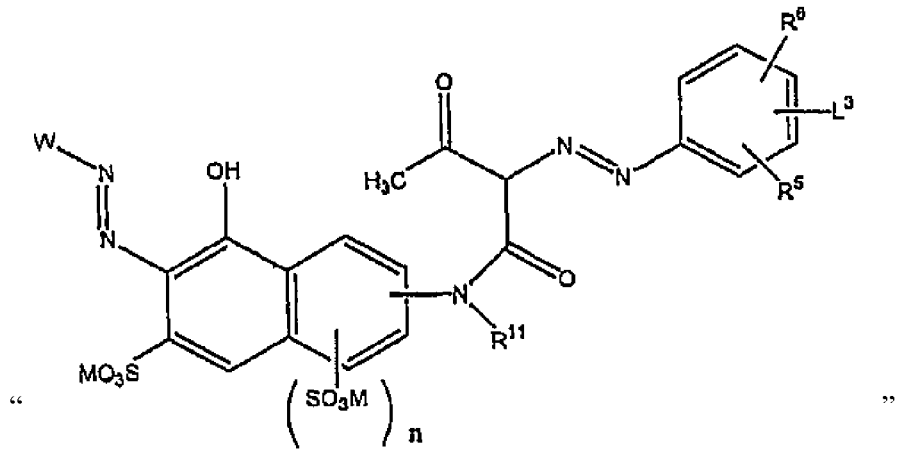"

should read
--
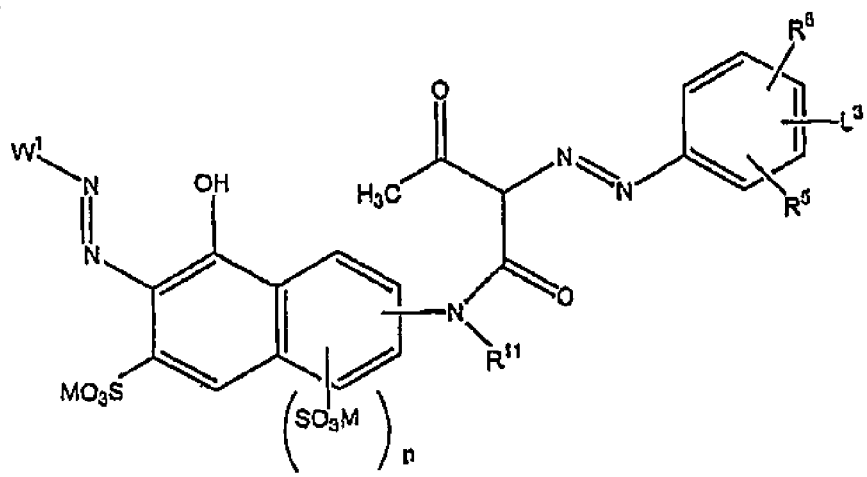
--.

UNITED STATES PATENT AND TRADEMARK OFFICE
CERTIFICATE OF CORRECTION

PATENT NO.       : 6,870,035 B2
APPLICATION NO.  : 10/639082
DATED            : March 22, 2005
INVENTOR(S)      : Ronald Pedemonte et al.

It is certified that error appears in the above-identified patent and that said Letters Patent is hereby corrected as shown below:

In Claim 8, Col. 42, lines 25-30

"

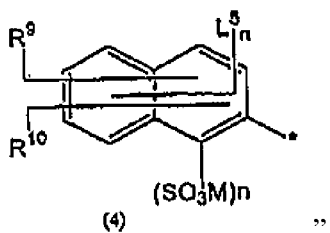

"

should read
--

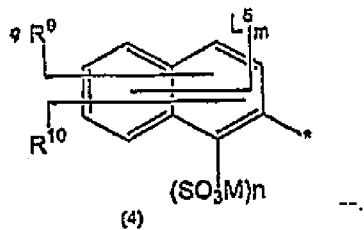   --.

Signed and Sealed this

Fourth Day of September, 2007

JON W. DUDAS
*Director of the United States Patent and Trademark Office*